(12) United States Patent
Johnson et al.

(10) Patent No.: US 9,614,406 B2
(45) Date of Patent: Apr. 4, 2017

(54) WEDGE FOR STATOR HAVING OVERMOLDED INSULATION

(71) Applicant: Nidec Motor Corporation, St. Louis, MO (US)

(72) Inventors: Philip S. Johnson, Granite, IL (US); Daniel E. Hilton, St. Louis, MO (US); Keith I. Hoemann, Fenton, MO (US); Daniel E. Bailey, Ballwin, MO (US)

(73) Assignee: Nidec Motor Corporation, St. Louis, MO (US)

( * ) Notice: Subject to any disclaimer, the term of this patent is extended or adjusted under 35 U.S.C. 154(b) by 238 days.

(21) Appl. No.: 14/027,981

(22) Filed: Sep. 16, 2013

(65) Prior Publication Data

US 2015/0076954 A1    Mar. 19, 2015

(51) Int. Cl.
| | |
|---|---|
| *H02K 3/487* | (2006.01) |
| *H02K 3/34* | (2006.01) |
| *H02K 3/46* | (2006.01) |
| *H02K 3/48* | (2006.01) |
| *H02K 3/32* | (2006.01) |
| *H02K 3/52* | (2006.01) |

(52) U.S. Cl.
CPC .............. *H02K 3/487* (2013.01); *H02K 3/32* (2013.01); *H02K 3/34* (2013.01); *H02K 3/345* (2013.01); *H02K 3/46* (2013.01); *H02K 3/48* (2013.01); *H02K 3/522* (2013.01); *H02K 2213/03* (2013.01)

(58) Field of Classification Search
CPC  H02K 3/32; H02K 3/34; H02K 3/345; H02K 3/46; H02K 3/487; H02K 3/48; H02K 3/52; H02K 15/10; H02K 3/522; H02K 2213/03

USPC ................. 310/214, 215, 194, 180, 216.009
See application file for complete search history.

(56) References Cited

U.S. PATENT DOCUMENTS

| | | | |
|---|---|---|---|
| 4,914,934 A | 4/1990 | Fritzsche et al. | |
| 5,489,811 A | 2/1996 | Kern et al. | |
| 5,763,978 A * | 6/1998 | Uchida ................. | H02K 3/325 310/214 |
| 5,831,366 A | 11/1998 | Kern et al. | |
| 6,147,431 A | 11/2000 | Asao et al. | |
| 6,188,158 B1 * | 2/2001 | DeLuca ................. | H02K 3/487 310/214 |
| 6,335,583 B1 | 1/2002 | Kusase et al. | |
| 6,337,530 B1 | 1/2002 | Nakamura et al. | |
| 6,346,758 B1 | 2/2002 | Nakamura | |
| 6,559,572 B2 | 5/2003 | Nakamura | |
| 6,729,011 B2 | 5/2004 | Asao et al. | |

(Continued)

*Primary Examiner* — Terrance Kenerly
*Assistant Examiner* — Alexander Singh
(74) *Attorney, Agent, or Firm* — Hovey Williams LLP

(57) ABSTRACT

A stator for use in an electric motor is disclosed. The stator comprises an annular core, a plurality of wedges, and a plurality of wedge-retaining structures. The core includes a plurality of arcuately spaced apart teeth. Each of the teeth includes a generally radial leg and a head projecting from the leg to present a pair of arcuately spaced apart head ends. A slot opening is defined between the opposed head ends of each adjacent pair of teeth. Each of the wedges is received within a corresponding slot opening. Each wedge-retaining structure is at least in part fixed relative to the core and cooperates with a respective one of the wedges to compressibly retain the respective wedge between the head ends.

10 Claims, 21 Drawing Sheets

(56) References Cited

U.S. PATENT DOCUMENTS

| | | |
|---|---|---|
| 6,792,673 B2 | 9/2004 | Barrera et al. |
| 6,892,439 B1 | 5/2005 | Neal et al. |
| 6,979,930 B2 | 12/2005 | Harada et al. |
| 6,993,822 B2 | 2/2006 | Park et al. |
| 7,116,031 B2 * | 10/2006 | Ahn ..................... D06F 37/304 29/596 |
| 7,221,072 B2 | 5/2007 | Ahn |
| 7,260,880 B2 | 8/2007 | Harada et al. |
| 7,260,881 B2 | 8/2007 | Harada et al. |
| 7,271,519 B2 | 9/2007 | Lee |
| 7,315,104 B2 | 1/2008 | Koshizaka et al. |
| 7,459,826 B2 | 12/2008 | Lee |
| 7,603,760 B1 | 10/2009 | Lebbin, Jr. |
| 7,698,803 B2 | 4/2010 | Mitsui et al. |
| 7,728,481 B2 | 6/2010 | Lee |
| 7,797,977 B2 | 9/2010 | Lebbin, Jr. |
| 8,042,256 B2 | 10/2011 | Harada et al. |
| 8,205,322 B2 | 6/2012 | Mitsui et al. |
| 8,344,580 B2 | 1/2013 | Rau et al. |
| 8,482,176 B2 | 7/2013 | Bailey et al. |
| 2003/0214198 A1 | 11/2003 | Harada et al. |
| 2004/0083598 A1 | 5/2004 | Barrera et al. |
| 2004/0189136 A1 * | 9/2004 | Kolomeitsev .......... H02K 1/148 310/216.082 |
| 2008/0179986 A1 | 7/2008 | Harada et al. |
| 2012/0223609 A1 | 9/2012 | Kojima |
| 2013/0328432 A1 | 12/2013 | Hoemann et al. |
| 2014/0175935 A1 * | 6/2014 | Tsuchiya ................ H02K 3/522 310/214 |

* cited by examiner

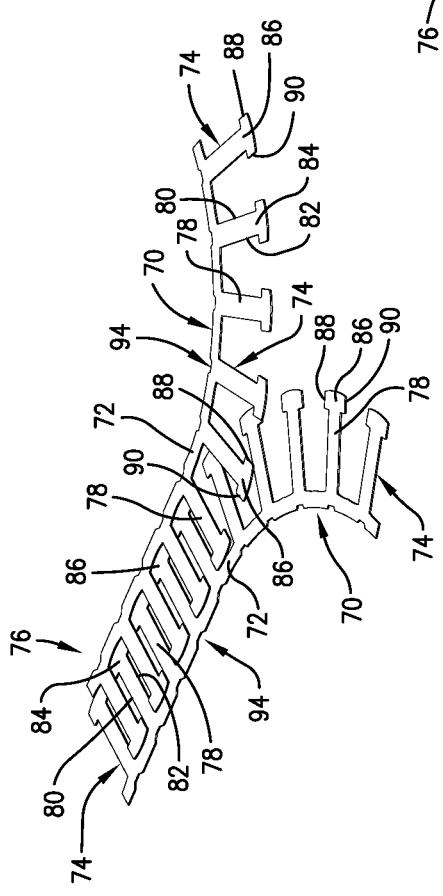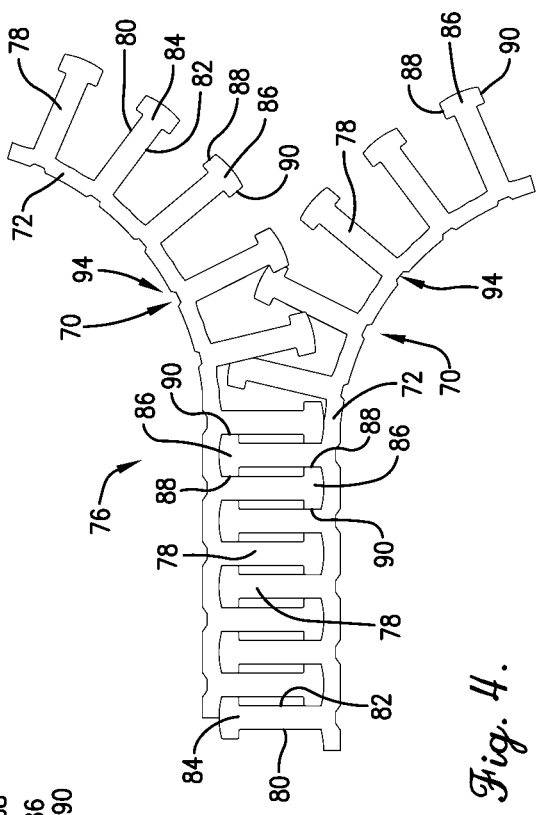

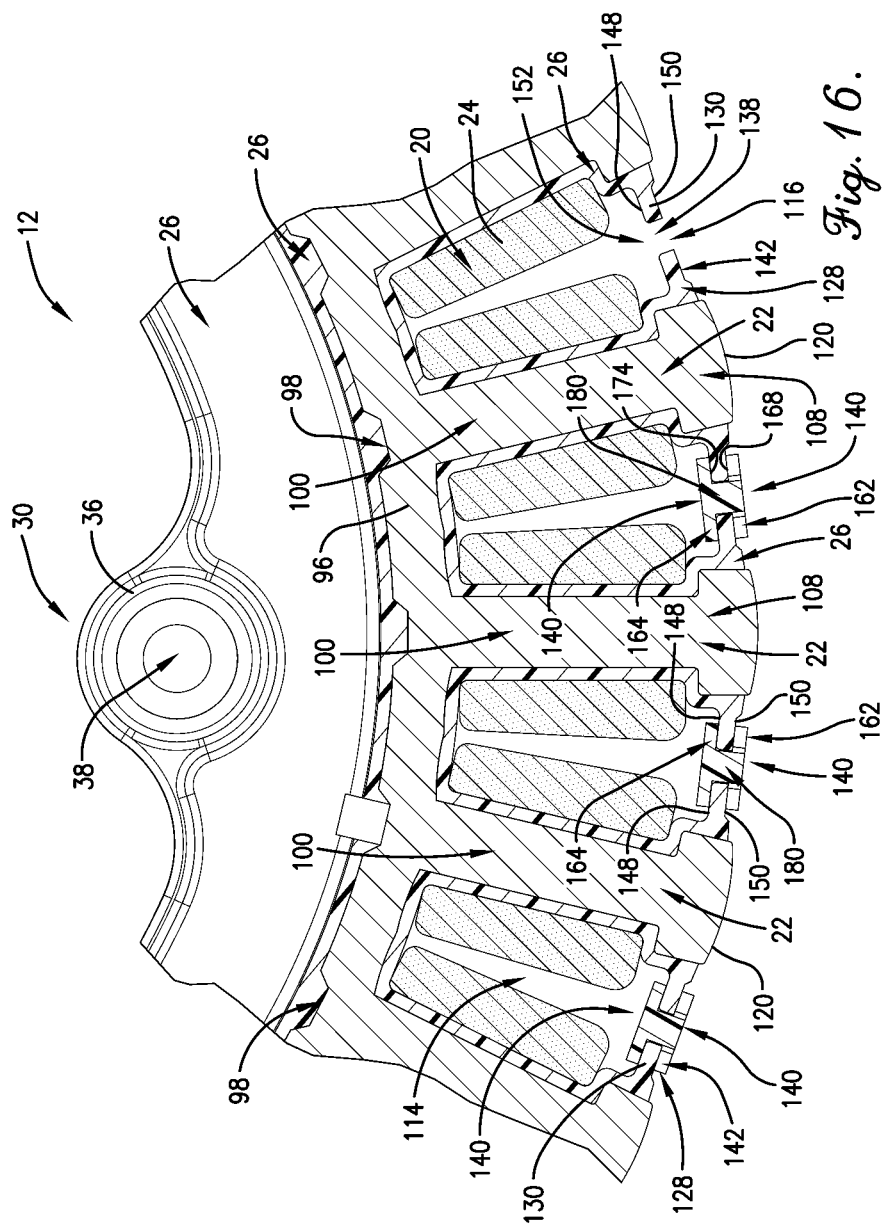

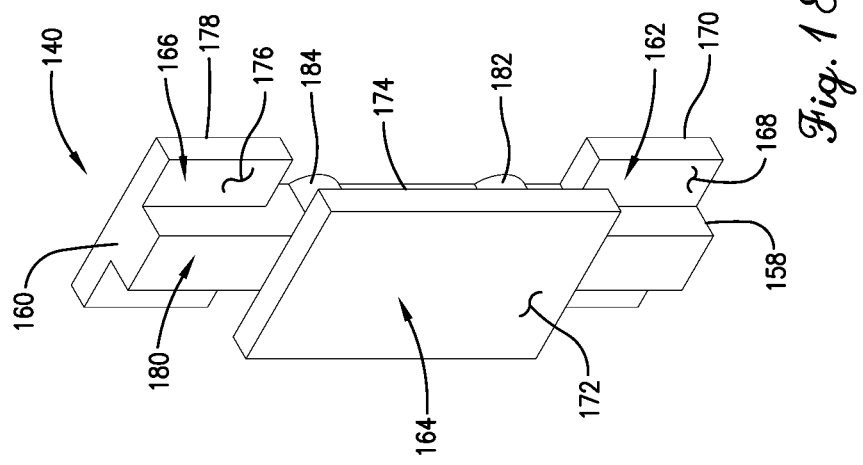
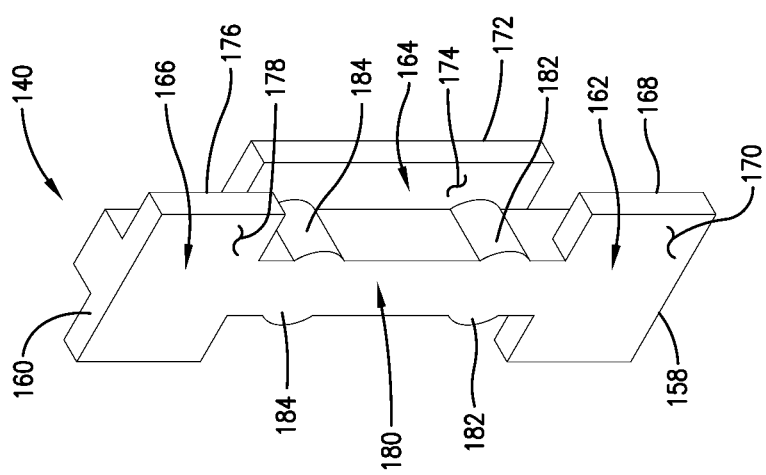

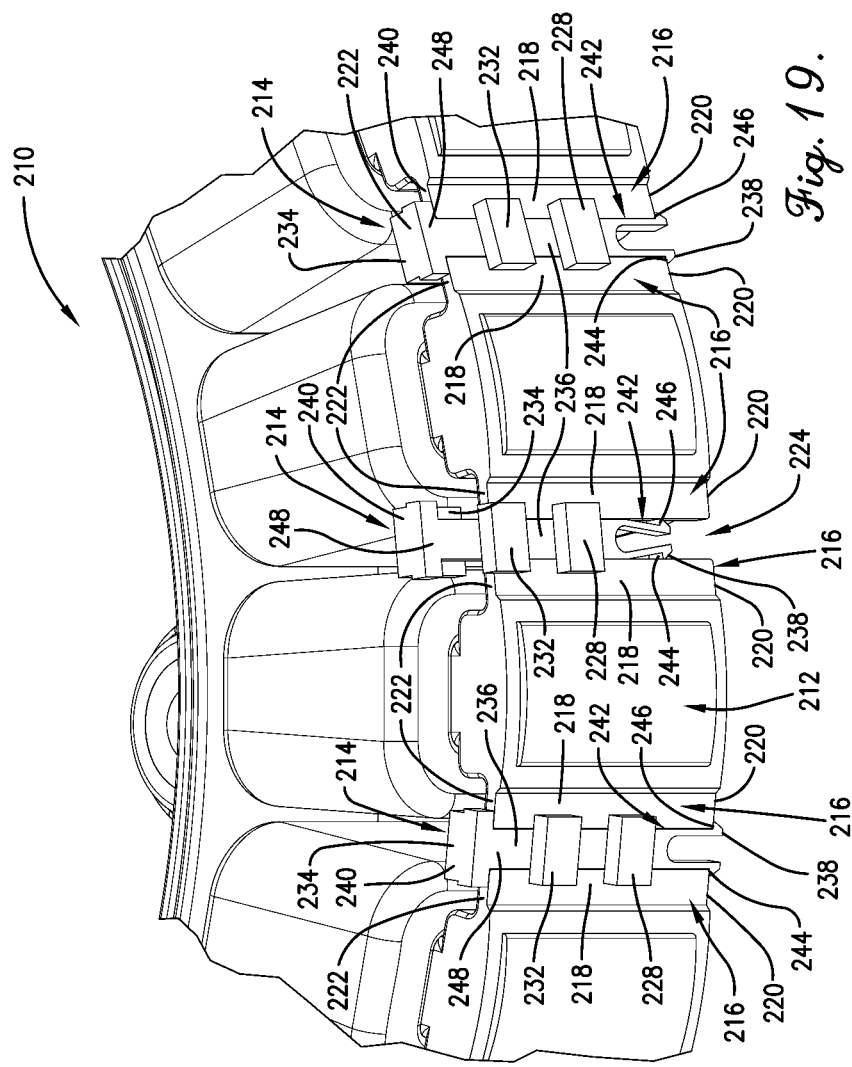

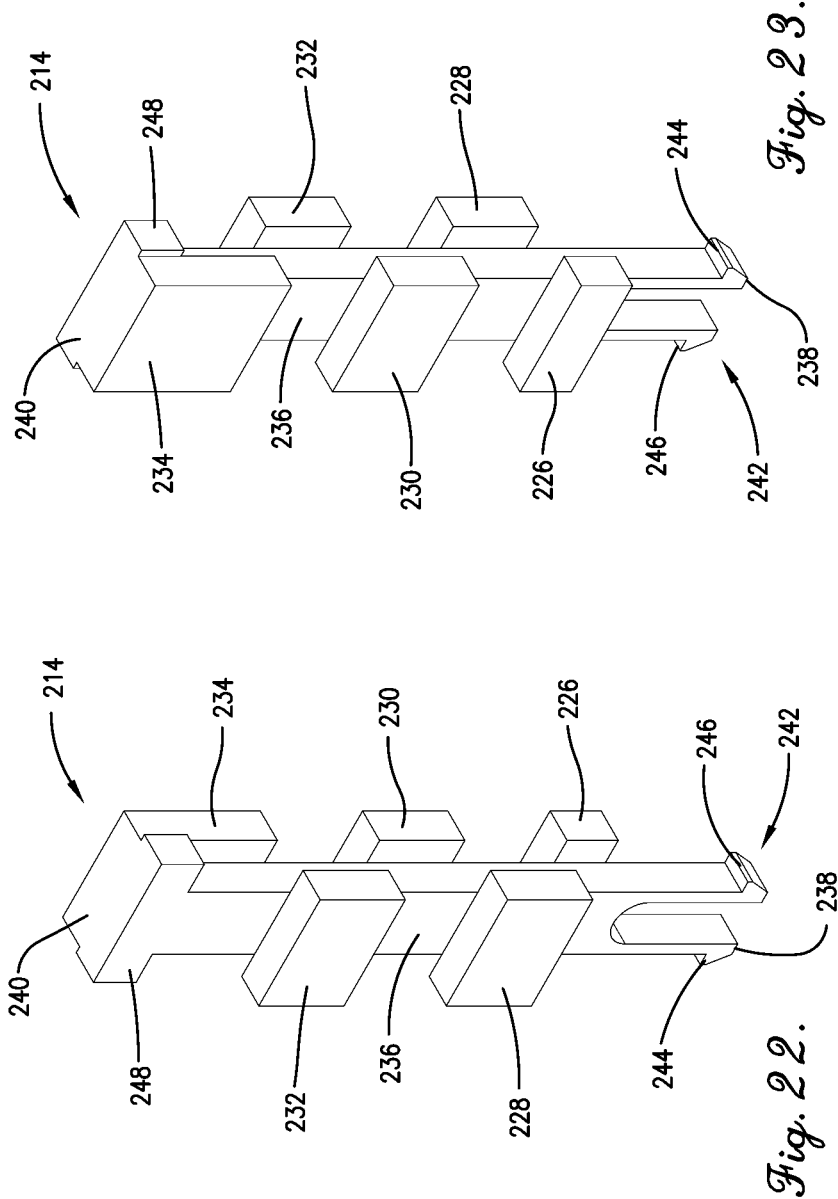

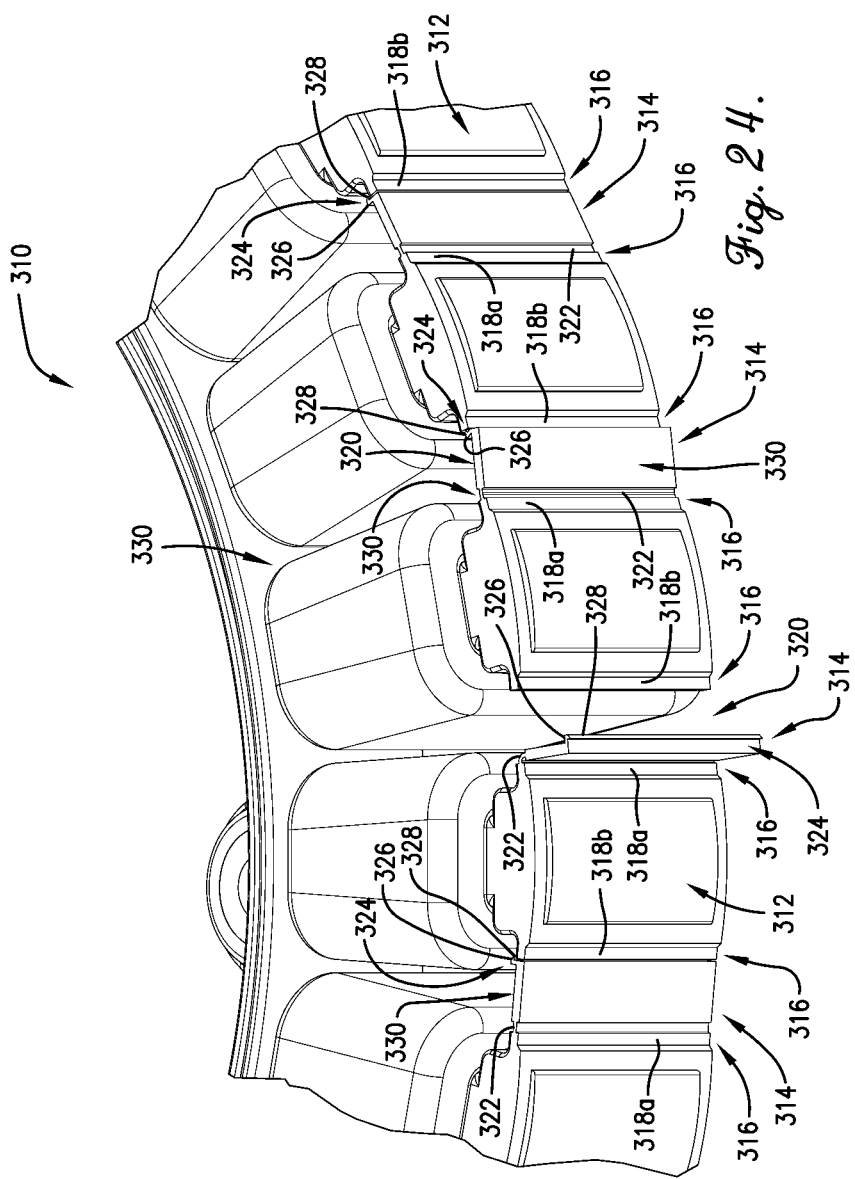

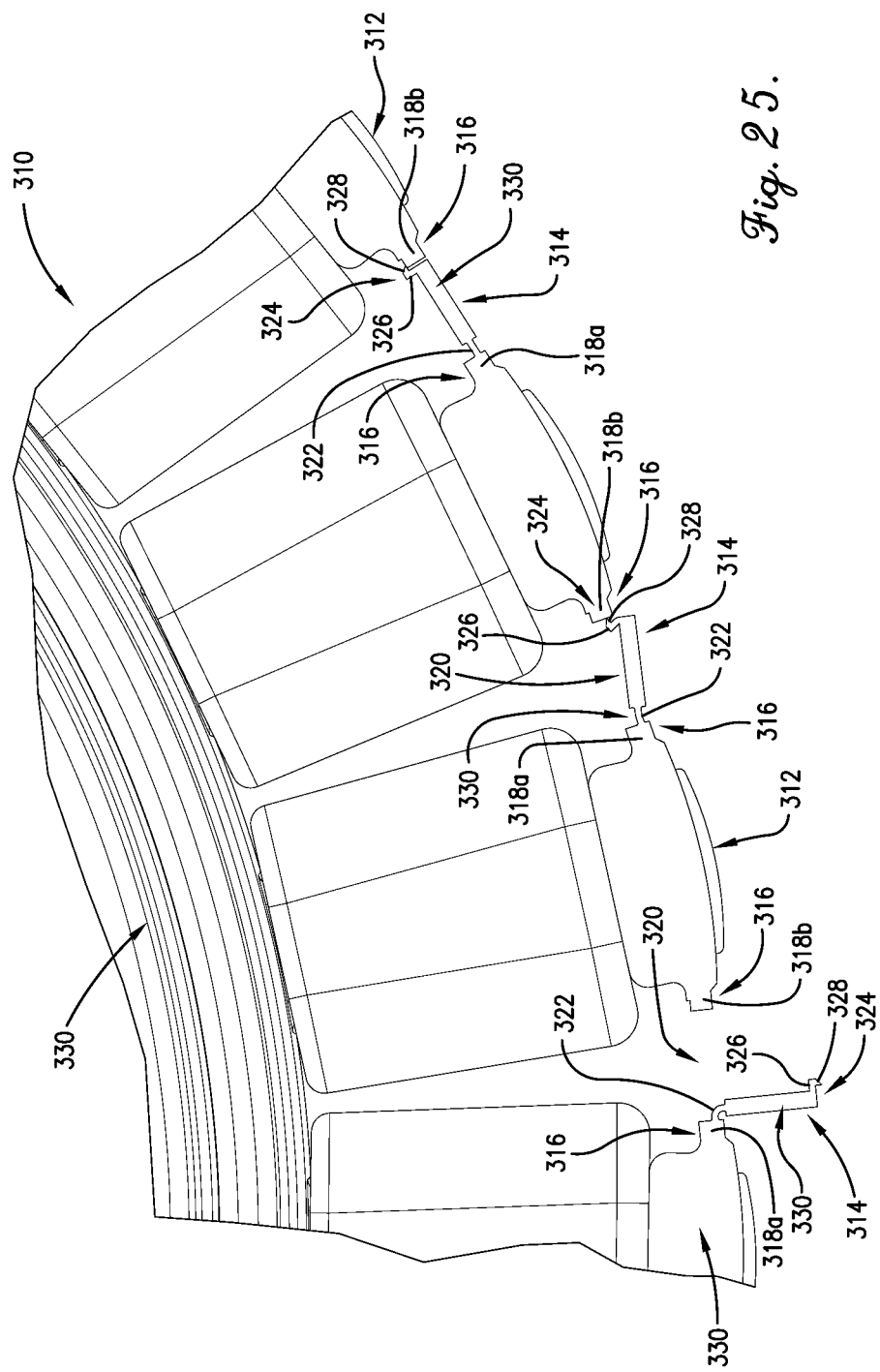

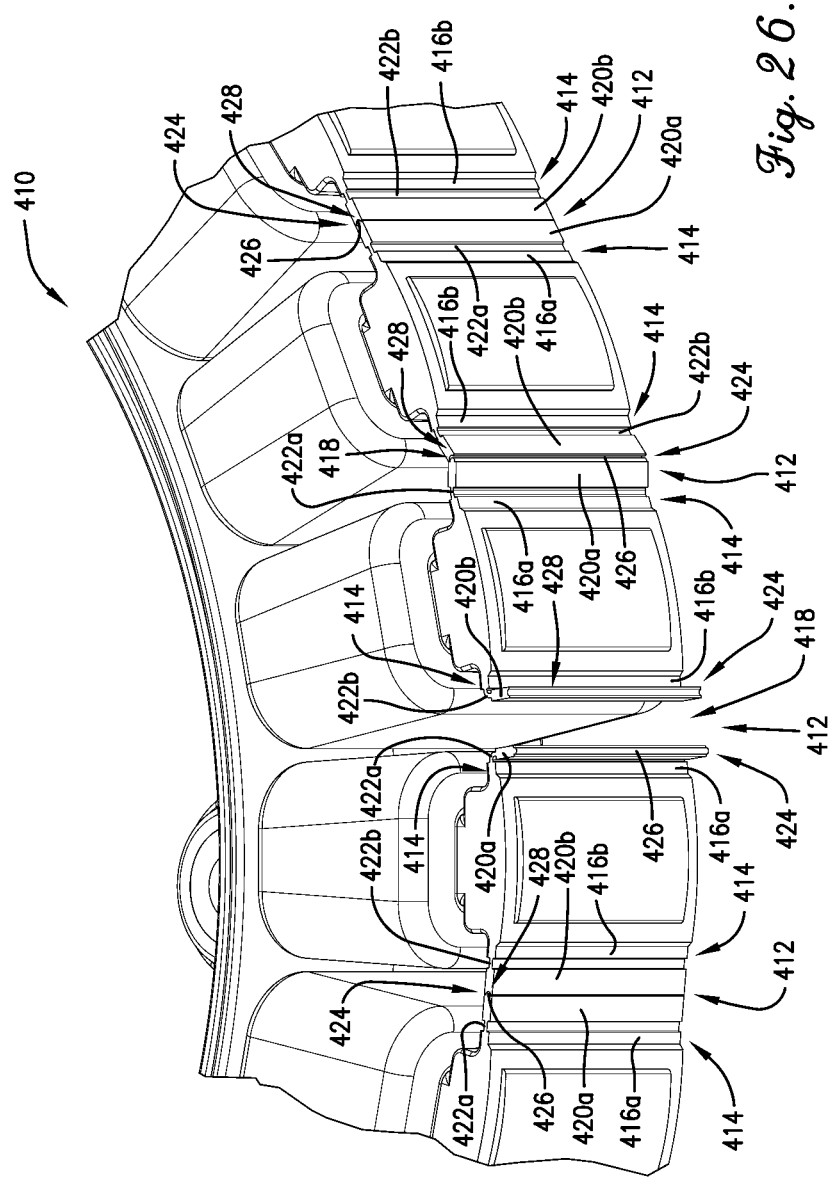

WEDGE FOR STATOR HAVING OVERMOLDED INSULATION

BACKGROUND OF THE INVENTION

1. Field of the Invention

The present invention relates generally to an electric motor for use in a machine. More specifically, the present invention concerns a stator wedge design that is particularly suitable for use with an overmolded stator.

2. Discussion of the Prior Art

Those of ordinary skill in the art will appreciate that electric motors are used in a variety of applications, including, but not limited to, vertical- or horizontal-axis washing machines, electric bicycles, and electric scooters. Fans, generators, and exercise equipment may also use electric motors.

Although many motors utilize wedges to reduce sound, irregular tooth geometry and insulation geometry makes it difficult to securely retain the wedges between the teeth.

SUMMARY

According to one aspect of the present invention, a stator for use in an electric motor is provided. The stator comprises an annular core, a plurality of stator wedges, and a plurality of wedge-retaining structures. The core includes a plurality of arcuately spaced apart teeth. Each of the teeth includes a generally radial leg and a head projecting from the leg to present a pair of arcuately spaced apart head ends, with a slot opening being defined between the opposed head ends of each adjacent pair of teeth. Each of the wedges is received within a corresponding one of the slot openings. Each of the wedge-retaining structures is at least in part fixed relative to the core and cooperates with a respective one of the wedges to compressibly retain the respective wedge between the head ends defining the corresponding slot opening. Each of the wedge-retaining structures and the respective wedge cooperatively prevent radial and axial movement of the respective wedge relative to the core.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 3 is a perspective view of a pair of dual-out stator laminations in the process of being separated;

FIG. 4 is a top view of the stator laminations of FIG. 3;

FIG. 16 is a cross-sectional view of the stator portion taken along line 16-16 of FIG. 13;

FIG. 17 is a front perspective view of the stator wedge depicted as part of the first preferred embodiment of the present invention;

FIG. 18 is a rear perspective view of the wedge shown specifically in FIG. 17;

FIG. 19 is a front perspective view of a portion of a stator constructed in accordance with a second preferred embodiment of the present invention, particularly illustrating a second preferred wedge embodiment;

FIG. 22 is front perspective view of the stator wedge shown in FIGS. 19-21;

FIG. 23 is a rear perspective view of the wedge shown specifically in FIG. 22;

FIG. 24 is a front perspective view of a portion of a stator constructed in accordance with a third preferred embodiment of the present invention, particularly illustrating a third preferred wedge embodiment;

FIG. 25 is a top view of the stator portion of FIG. 24;

FIG. 26 is a front perspective view of a portion of a stator constructed in accordance with a fourth preferred embodiment of the present invention, particularly illustrating a fourth preferred wedge embodiment.

Figure 1:
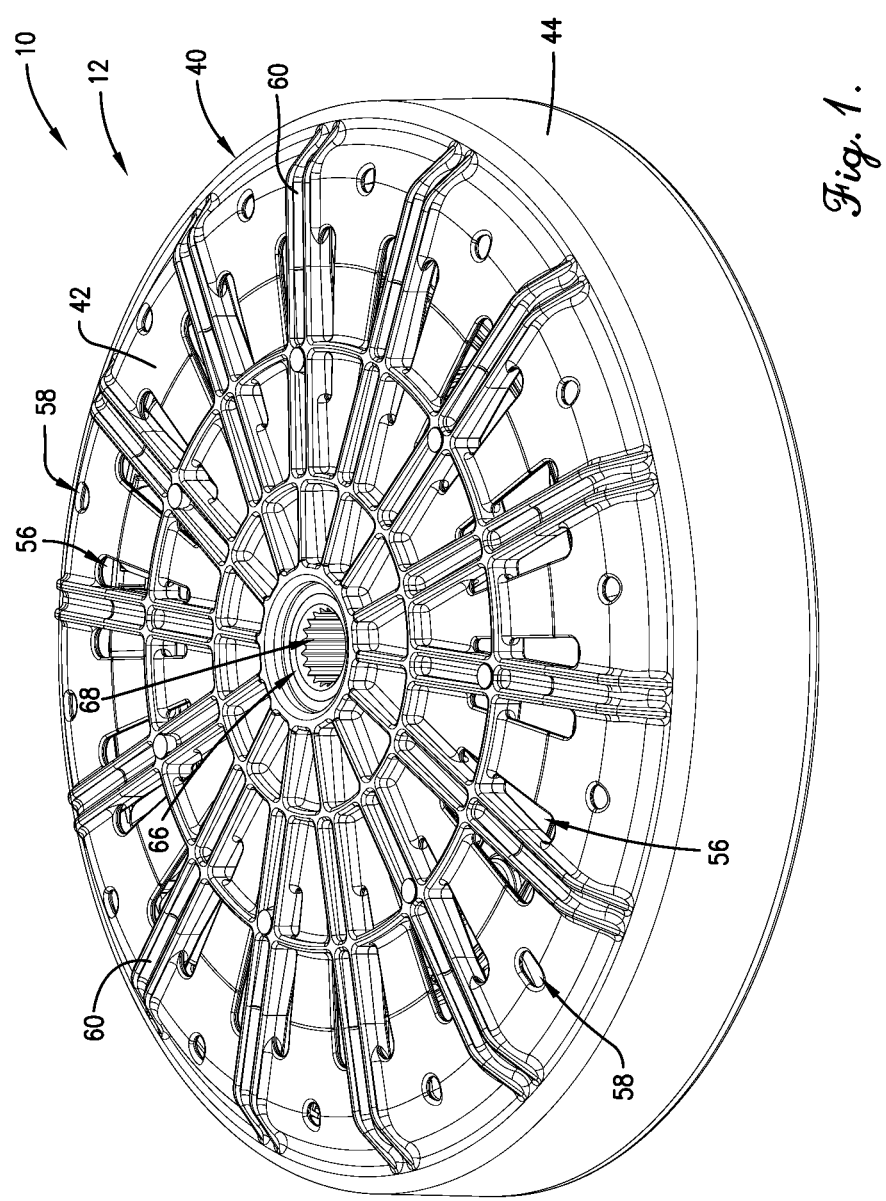
FIG. 1 is a top perspective view of an electric motor constructed in accordance with a first preferred embodiment of the present invention, particularly illustrating the rotor of the motor.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Figure 2:
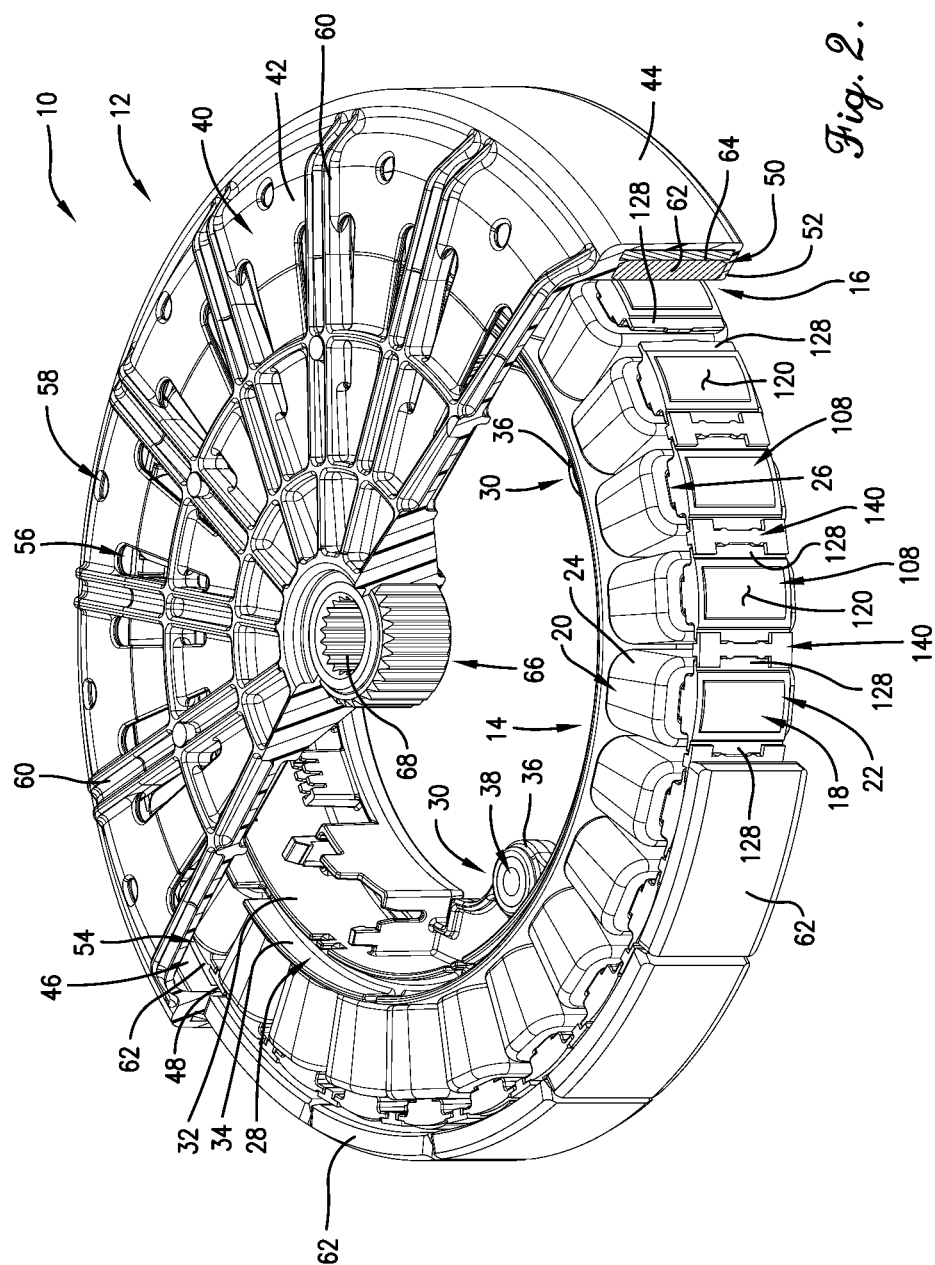
FIG. 2 is a partially sectioned top perspective view of the motor of FIG. 1, illustrating both the rotor and the stator.

Turning initially to FIGS. 1 and 2, a motor 10 is provided. In a preferred embodiment, as illustrated, the motor 10 broadly includes a rotor 12 and a stator 14 spaced partially inside the rotor 12 so that a circumferentially extending gap 16 is defined between the rotor 12 and the stator 14.

As will be discussed in more detail below, the motor 10 is preferably a brushless permanent magnet (BPM) direct-drive motor, although it is permissible within the scope of some aspects of the present invention for an alternative motor type to be used.

The stator 14 preferably comprises a generally annular core 18 and a plurality of wire coils 20 wound around the core 18. According to some aspects of the present invention, the core may be arcuately or circumferentially continuous or discontinuous or comprise a plurality of interconnected arcuate sections, although a preferred continuously helically wound embodiment will be described in greater detail below.

The core 18 preferably includes a plurality of arcuately spaced apart, radially extending teeth 22. As will be discussed in more detail below, the teeth 22 are preferably of a laminated design and are shaped in accordance with geometric constraints that are also discussed in greater detail below. It should be understood, however, that it is within the scope of some aspects of the present invention for integrally formed (i.e., a single integral body forming each tooth rather than a stack of laminations) teeth to be provided or for any one or more of a wide variety of tooth shapes to be used.

The coils 20 preferably comprise electrically conductive wiring 24. The wiring preferably comprises aluminum wiring, although copper or another electrically conductive material could also be used without departing from the scope of the present invention. It is noted that the coils 20 and the wiring 24 are shown schematically in the illustrations.

Preferably, the stator 14 is configured to be wound using a fly or shed stator winding process. However, it is permissible for an alternately wound stator to be provided without departing from the scope of some aspects of the present invention.

Figure 10:
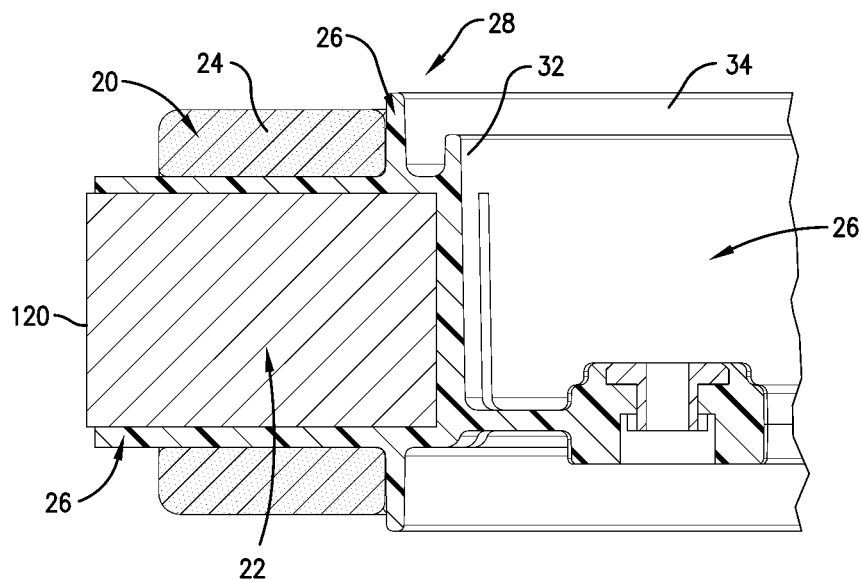
FIG. 10 is a side cross-sectional view of the stator portion taken along line 10-10 of FIG. 8, particularly illustrating the continuity of the overmolding.

As shown in FIGS. 2, 10, and others, in a preferred embodiment, the stator core 18 is electrically insulated by means of overmolding 26. As will be discussed in greater detail below, the overmolding 26 preferably covers substantially the entire core 18.

The overmolding 26 preferably comprises a synthetic resin material and most preferably comprises polyethylene, although any one or more at least substantially electrically insulative materials may be used without departing from the scope of the present invention. It is also permissible according to some aspects of the present invention for insulation to be provided additionally or exclusively by one or more discrete insulative structures (e.g. non-conductive tabs or overlays) and/or by at least partial coating of the core with an electrically insulative coating. Such a coating might, for instance, be a powder coating such as Scotchcast™ Electrical Resin 5555, available from 3M™.

As best shown in FIG. 2, the overmolding 26 preferably defines wire routing structure 28 and stator mounting structure 30. As best shown in FIGS. 2 and 10, the wire routing structure 28 preferably comprises concentric inner and outer annular-shaped walls 32 and 34, respectively, projecting axially relative to the core 28. It is permissible, however, for alternate wire routing structures to be defined. The walls might be non-concentric, for instance, or routing might be achieved via hooks and portals rather than the preferred walls. Furthermore, according to some aspects of the present invention, the wire routing structure might be partially or entirely discrete from the overmolding.

The stator mounting structure 30 preferably comprises a plurality of arcuately spaced apart fastener-receiving tabs 36. As shown in FIG. 2, in a preferred embodiment, three such tabs 36 are provided and are evenly spaced apart. A fastener-receiving opening 38 is provided in each of the tabs 36. Fasteners (not shown) inserted through the fastener-receiving openings 38 may be used to fix the stator 14 to the machine, with the mounting structure 30 thus supporting the stator 14 thereon. It is permissible according to some aspects of the present invention, however, for alternatively designed or defined stator mounting structure to be present. The mounting structure might include clips for instance, rather than requiring the use of discrete fasteners; or it might be partially or entirely discrete from the overmolding.

As best shown in FIGS. 1 and 2, the rotor 12 preferably includes a rotor can 40 that includes a radially projecting spoked base 42. The rotor can 40 further includes a circumferentially extending outer support wall 44 and a discontinuous, circumferentially extending inner support wall 46. The inner wall 46 preferably comprises a plurality of substantially rectangular columns 48 (one shown in FIG. 2) that are preferably formed during the molding of the rotor can 40.

In the illustrated embodiment, both of the support walls 44,46 project axially upwardly from the base 42, with the base 42 and the support walls 44,46 thus defining a channel 50 therebetween. An annular top wall 52 extends between the inner and outer support walls 44,46 to enclose the channel 50, with the exception of a plurality of windows 54 (one shown in part in FIG. 2), each of which is bounded by a pair of the columns 48, the base 42, and the top wall 52.

In the illustrated preferred embodiment, the base 42 of the rotor can 40 also preferably includes a plurality of ventilation slots 56 and ventilation apertures 58. It is also preferable that a plurality of support ribs 60 are formed as part of the base 42. In addition to functioning as structural supports, at least a portion of the ribs 60 may also be configured in such a manner as to provide cooling assistance for the motor 10 by disturbing nearby air.

The rotor can 40 of the first preferred embodiment preferably comprises a plastic material such as polypropylene, although any one or more of a variety of other materials may be used without departing from the scope of the present invention. It is also permissible and in some instances preferred that the material of the rotor can include reinforcing fibers such as glass fibers, although use of other reinforcement techniques or use of no additional reinforcement is within the scope of the present invention.

As best shown in FIG. 2, the rotor 12 preferably includes a plurality of arcuately spaced apart magnets 62 positioned in the windows 54. The magnets 62 are preferably permanent magnets. Most preferably, the magnets 62 comprise ferrite. Although high grade ferrite magnets may be used, lower grade magnets are also permissible. For instance, grade six (6) ferrite magnets are permissible and, according to some aspects of the present invention, preferred.

The rotor 12 also preferably includes a backing ring 64 extending circumferentially outside the magnets 62. The backing ring 64 preferably comprises iron, although other suitable materials may be used.

Preferably, as best shown in FIG. 1, the base 42 is configured for connection of the rotor can 40 to a rotatable shaft (not shown) via a coupler 66. Preferably, such engagement is effected by the interaction of the splines on the shaft and inner splines 68 on the coupler 66, although other engagement mechanisms fall within the scope of the present invention. For instance, interference screws, press fits, or adhesives could all be used, either singly or in combination.

The coupler 66 also engages the base 42 of the rotor can 40, such that the rotor can 40, the coupler 66, and the shaft preferably all rotate together about a single axis of rotation. Although a single axis of rotation is preferable, it is with the scope of the present invention for multiple axes of rotation to be defined.

Additional details of an exemplary rotor can be found in U.S. Pat. No. 8,482,176, assigned of record to the assignee of the present invention and hereby incorporated herein by reference in its entirety.

It is noted that, in addition to the permissible variations described above, certain more significant rotor variations may be permissible without departing from the scope of the present invention. The rotor might be an inner rotor, for instance, or be a spoked rotor in which the magnets are alternately circumferentially arranged with pole pieces. Such a spoked rotor is described in more detail in U.S. patent application Ser. No. 13/911,882, filed Jun. 6, 2013, assigned of record to the assignee of the present invention and hereby incorporated herein by reference in its entirety.

Stator Formation and Tooth Shapes

Figure 5:
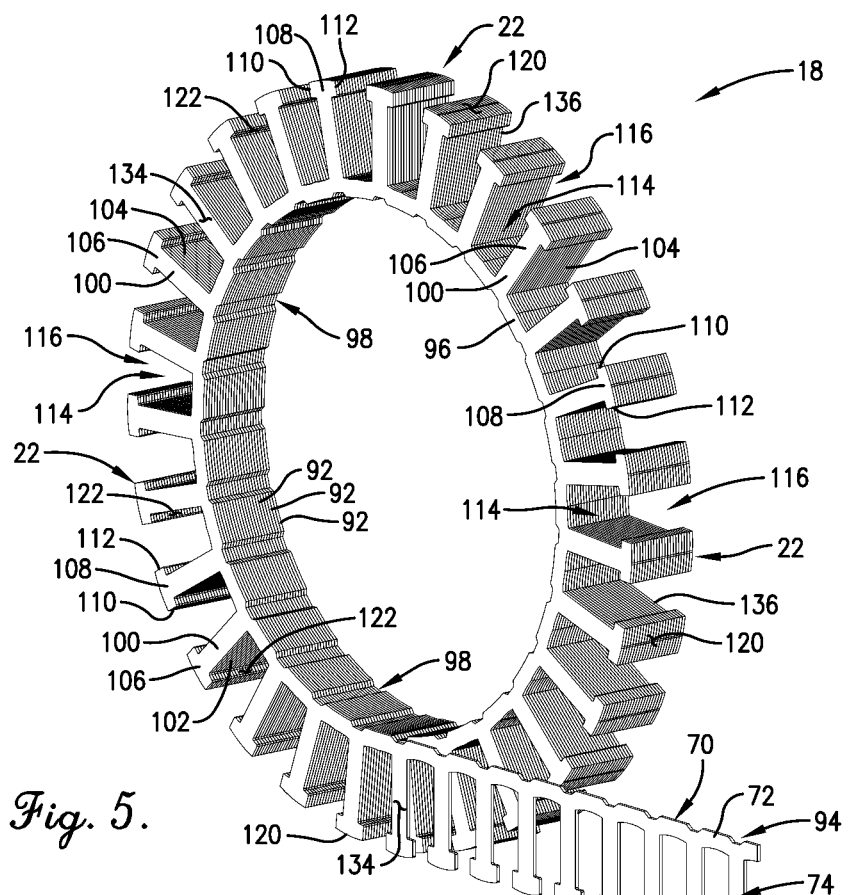
FIG. 5 is a perspective view of the stator core of FIG. 2 near the completion of its formation using one of the stator laminations of FIGS. 3 and 4.

As noted previously, in a preferred embodiment, the stator 14 includes a helically wound stator core 18, best shown in FIG. 5. The core 18 is preferably formed from a dual-out stator lamination 70, a nested pair of which is illustrated in FIGS. 3 and 4. Each lamination 70 preferably includes a yoke portion 72 and a plurality of spaced apart tooth portions 74. As shown, the nested pair of laminations 70 is preferably formed from an elongated metal strip 76, with each of the yoke portions 72 extending at least substantially parallel to one another and with each of the tooth portions 74 being at least partly positioned between an adjacent pair of tooth portions 74 of the other lamination 70.

Preferably, the laminations 70 are punched at least substantially simultaneously from the metal strip 76, although alternative methods of defining the laminations are permissible according to certain aspects of the present invention. Non-simultaneous punching may also be permissible.

As will be discussed in further detail below, each tooth portion 74 preferably includes an elongated leg portion 78 having circumferentially opposed sides 80 and 82 and defining a radially outermost end 84. Each leg portion 78 preferably has a substantially straight, rectangular shape, although non-straight leg portions or segmented leg portions are permissible according to some aspects of the present invention.

Each tooth portion 74 preferably further includes a generally transverse head portion 86 projecting generally arcuately from the radially outermost end 84 of the respective leg portion 78 to present opposite head portion ends 88 and 90 spaced from the leg portion 78. However, it is possible for the positioning of the head portions 86 relative to the leg portions 78 to vary from the exemplary arrangement described above. For instance, the head portions might suitably be positioned adjacent a radially innermost end of the leg portions if an inner rotor motor is desired.

As illustrated, during fabrication of the laminations, the head portion ends 88 and 90 of each tooth portion 74 of one of the laminations 70 are preferably positioned immediately adjacent the opposed sides 80,82 of the leg portions 78 of the adjacent pair of tooth portions 74 of the other lamination 70. In this manner, scrap from the strip 76 is at least substantially minimized after the punching process (or other lamination-defining process) is complete.

After the laminations 70 have been defined, the laminations 70 are separated from each other, and each is arranged into a separate stator core such as the stator core 18. Preferably, such arrangement is via helical winding, wherein the lamination 70 is continuously coiled upon itself to define a plurality of layers 92. That is, the yoke portion 72 preferably defines a continuous helical coil upon completion of the fabrication process, while each of the tooth portions 74 are brought into axial alignment with others of the tooth portions.

Figure 6:
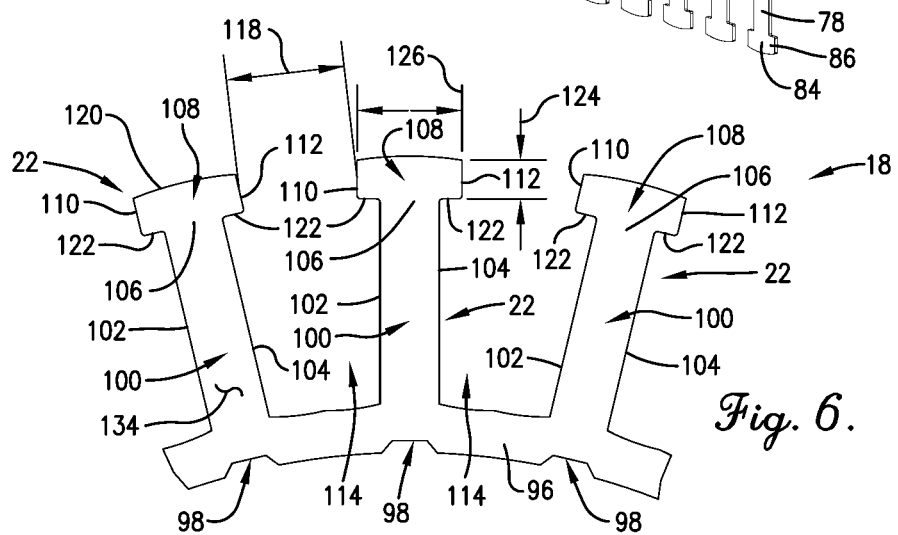
FIG. 6 is a top perspective view of a portion of the stator core of FIG. 5, particularly illustrating the preferred tooth geometry.

As best shown in FIG. 6, a plurality of spaced apart notch portions 94 are formed in the yoke portion 72. The notch portions 94 preferably facilitating bending of the lamination 70 into the annular shape as required during the coiling process. It is permissible, however, for slits or other means of facilitating bending to be provided in addition to or as an alternative to notches of the sort shown in FIG. 6 and others. Furthermore, the lamination 70 may alternatively be formed of a sufficiently flexible material to eliminate the need for notches, slits, or other structure for facilitating bending of the lamination.

Preferably, separation of the laminations 70 and the winding of each lamination 70 to form a core, such as the core 18, occurs at least substantially simultaneously. For instance, an aft end of a first lamination 70 might still be engaged with the aft end of a second lamination 70 in the strip 76, while the fore end of the first lamination 70, having already been separated from the fore end of the second lamination 70, is being helically wound.

Although a dual-out, helically wound core 18 as described above is preferred, it is permissible according to some aspects of the present invention for any of a variety of alternative stator formation techniques to be used. The core might include a plurality of discrete, stacked laminations, for instance, or be formed of a single, non-laminated piece of material.

As best shown in FIGS. 5 and 6, after assembly of the core 18, the yoke portions 72 align to collectively define a yoke 96 having notches 98 defined therein. Furthermore, as also illustrated in FIGS. 5 and 6, the tooth portions 74 align to collectively define a plurality of teeth 22 (previously introduced). In keeping with the above, the leg portions 78 define legs 100 each having circumferentially opposed sides 102, 104 and defining a radially outermost end 106. Each leg 100 preferably has a substantially straight, rectangular shape, although non-straight legs or segmented legs are permissible according to some aspects of the present invention. The head portions 86 define generally transverse heads 108 projecting generally arcuately from the radially outermost ends 106 of the corresponding legs 100 to present opposite head ends 110 and 112 spaced from the legs 100. However, as for the head portions 86, it is of course possible for the positioning of the heads 108 relative to the legs 100 to vary from the exemplary arrangement described above. For instance, the heads might suitably be positioned adjacent a radially innermost end of the legs if an inner rotor motor is desired.

As best shown in FIGS. 5 and 6, a plurality of slots 114 are preferably defined by the teeth 22. As shown in FIG. 6, an associated generally arcuate slot opening 116 having a generally circumferential dimension referred to herein as a slot opening distance 118 is preferably defined between each adjacent pair of heads 108. More particularly, each slot opening 116 is preferably defined between adjacent head ends 110 and 112 on adjacent teeth 22.

Preferably, the teeth 22 are evenly spaced apart, such that the slot opening distances 118 are uniform. According to some aspects of the present invention, however, non-uniform spacing is permissible.

The previously mentioned coils 20 are preferably received in the slots 114.

In a preferred embodiment, the stator 14 includes twenty-seven (27) teeth 22 defining twenty-seven (27) slots 114 therebetween, while the rotor 12 defines thirty (30) poles. However, it is permissible according to some aspects of the present invention for alternate slot-pole ratios and/or numbers to be used.

Preferably, each tooth head 108 presents an at least substantially continuous, curved radially outermost face 120. The outermost faces 120 preferably cooperatively present the outer radial periphery of the core 18, with the periphery thus being discontinuous. Each tooth head 108 further preferably presents a discontinuous, generally flat radially innermost face 122 extending on either side of the respective leg 100.

As noted previously, the overmolding 26 preferably covers at least substantially the entire core 18. Most preferably, at least part of the radially outermost face 120 of each tooth 22 is devoid of the overmolding 26 and thereby exposed. Thus, the aforementioned gap 16 (see FIG. 2) is defined at least substantially by the teeth 22 (or more particularly, the outermost faces 120) and the rotor 12.

In a preferred embodiment and as illustrated in FIG. 6, each tooth head 108 defines a tooth head height 124 measured in at least a substantially radial direction. Preferably, the tooth head height 124 is at least substantially constant between the head ends 110 and 112, with minor variations being inherent due to the preferred curvature of the outermost face 120 in contrast to the flatness of the innermost face 122.

Each tooth head 108 also preferably presents a tooth head width 126 defined between the head ends 110 and 112 (see FIG. 6).

As is readily understood by those of ordinary skill in the art, electric motor design often requires a balancing of desired motor cost, motor performance, and motor envelope (i.e., the space designated for the motor in or on the machine). Magnet quality, wiring material, core height, coil turns, and other parameters may be varied to achieve an optimal balance, with variations in each parameter generally resulting in both positive and negative consequences.

In the preferred embodiment, for instance, the slots 114 are large enough to enable use of a high number of turns in the coils 20, which in turn enables use of lower-cost aluminum wiring 24 rather than higher-cost copper wiring. However, high-speed efficiency requirements were initially unmet when large slots and aluminum wiring as described above were tested with an at least substantially conventional motor design.

Fortunately, it was determined that certain variations in tooth shape could be implemented to unexpectedly provide critical benefits. More particularly, such variations were found to result in a surprising decrease in cogging and increase in inductance and stator reactance. Demagnetization capability was also improved. More particularly, improved performance characteristics were achieved when the ratio of each tooth head height 124 to each adjacent slot opening distance 118 was at least about twenty-eight hundredths (0.28) and when the ratio of each tooth head width 126 to each adjacent slot opening distance 118 was less than about one and thirty-one hundredths (1.31).

Although any dimensional characteristics meeting the above requirements may be suitable, in a preferred embodiment, a core 18 having an axial height of twenty-eight (28) mm, an inner diameter of ninety and five tenths (90.5) mm, and an outer diameter of two hundred eight-four (284) mm is provided. The coils 20 preferably comprise one hundred forty-eight (148) turns of Number Eighteen (#18.0) aluminum wiring 24. The motor 10 includes twenty-seven (27) slots and thirty (30) poles. Each tooth 22 has a tooth head width 126 of fifteen and ninety thousandths (15.090) mm and a tooth head height 124 of six and one hundred seventy-seven thousandths (6.177) mm. The slot opening distance 118 is preferably seventeen and fifty-four thousandths (17.054) mm.

Wire Retention Wings

As best shown in FIGS. 7-9 and 11, the overmolding 26 preferably defines a plurality of wire retention wings 128. More particularly, a pair of wire retention wings 128 preferably extends at least substantially circumferentially outwardly relative to each of the teeth 22. It is noted, however, that it is permissible according to some aspects of the present invention for one or more of the wings to be discrete from the overmolding. Furthermore, axially extending components of the wings may be additionally provided without departing from the scope of the present invention.

Figure 7:
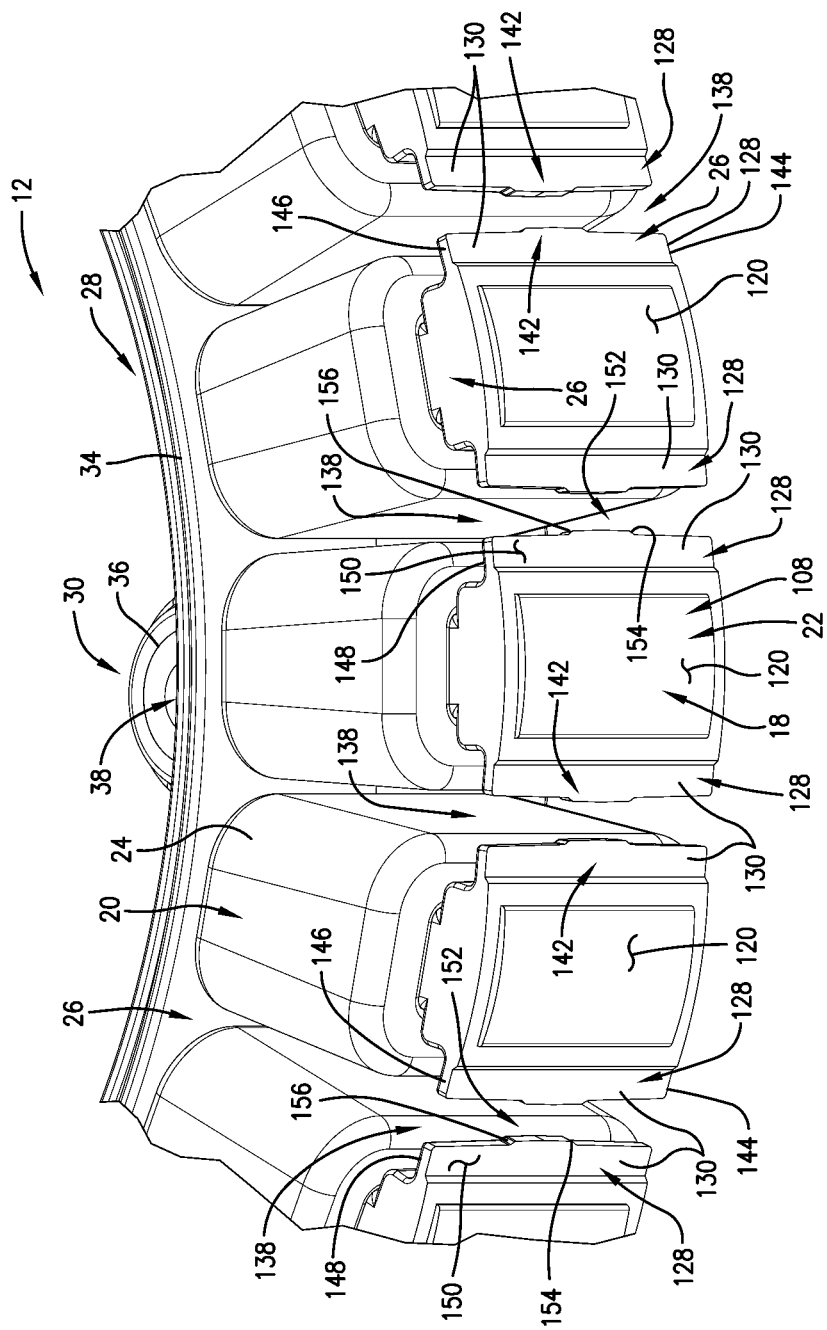
FIG. 7 is a top perspective view of a portion of the stator, particularly illustrating the wire retention wings and the wedge-retaining structures.
Figure 8:
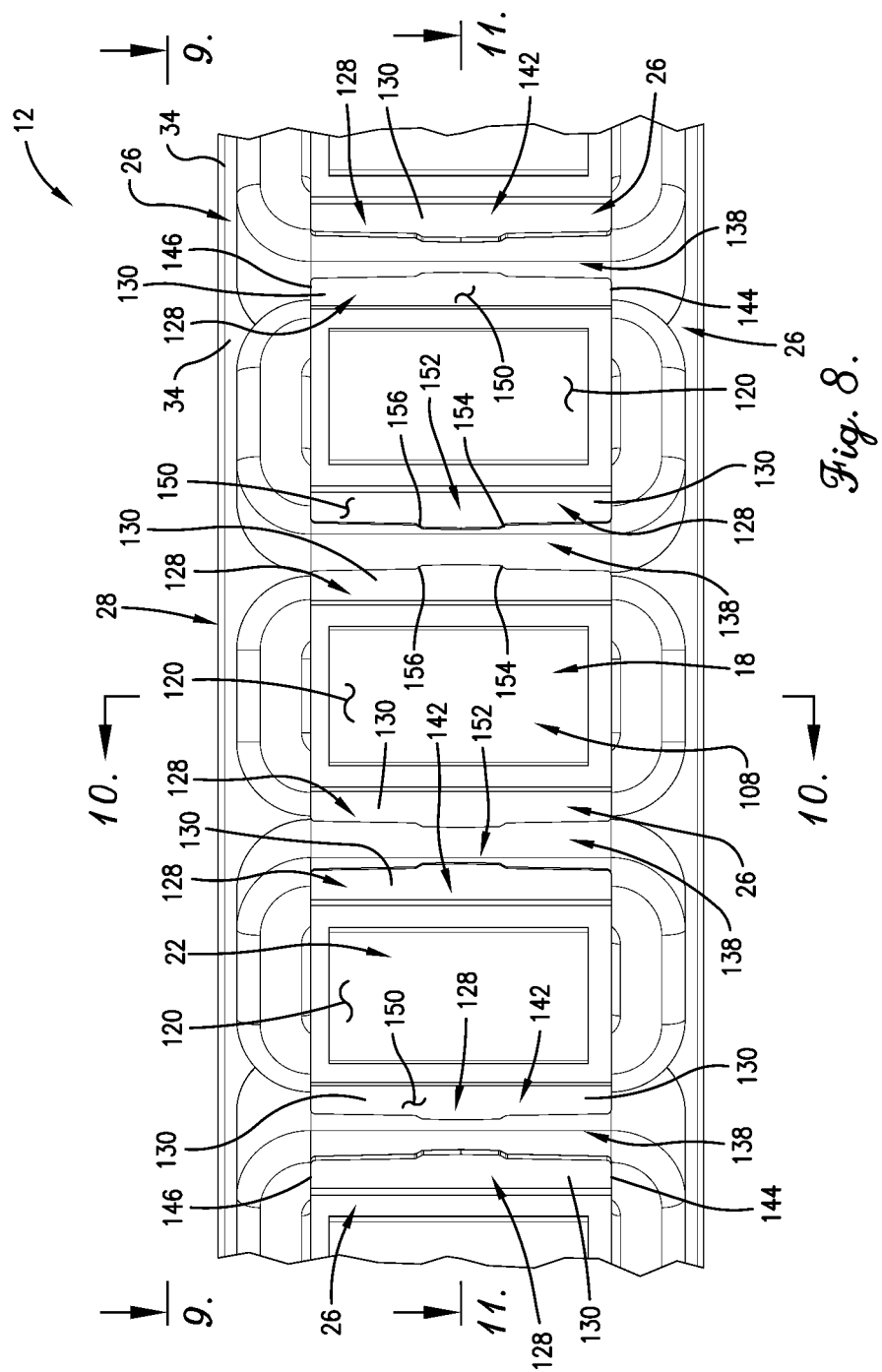
FIG. 8 is a side view of the stator portion of FIG. 7.
Figure 9:
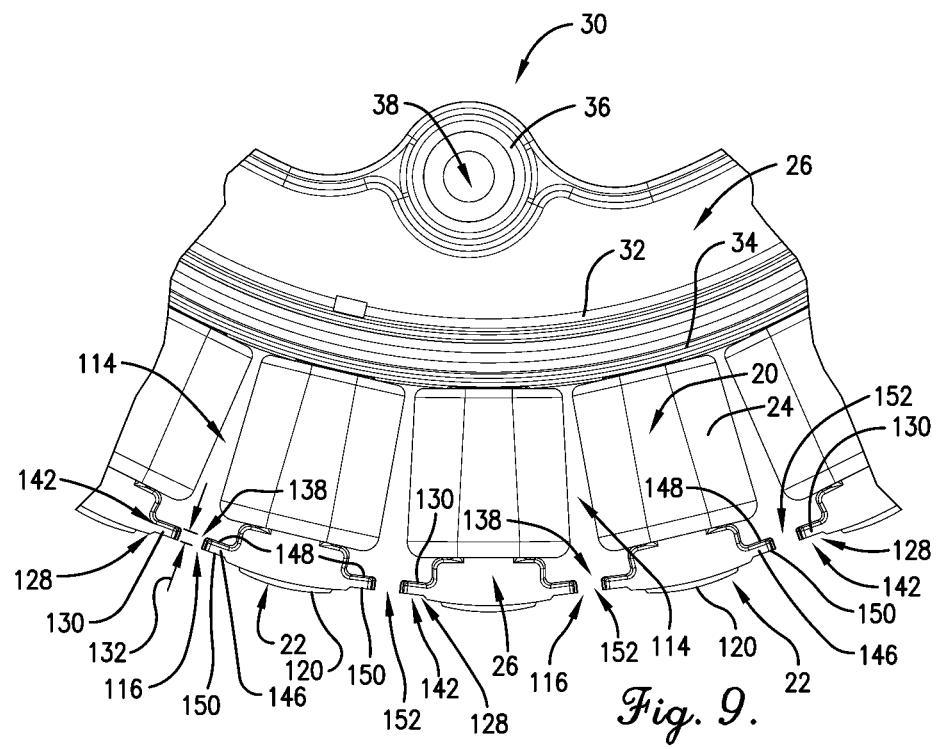
FIG. 9 is a top view of the stator portion taken along line 9-9 of FIG. 8.
Figure 11:
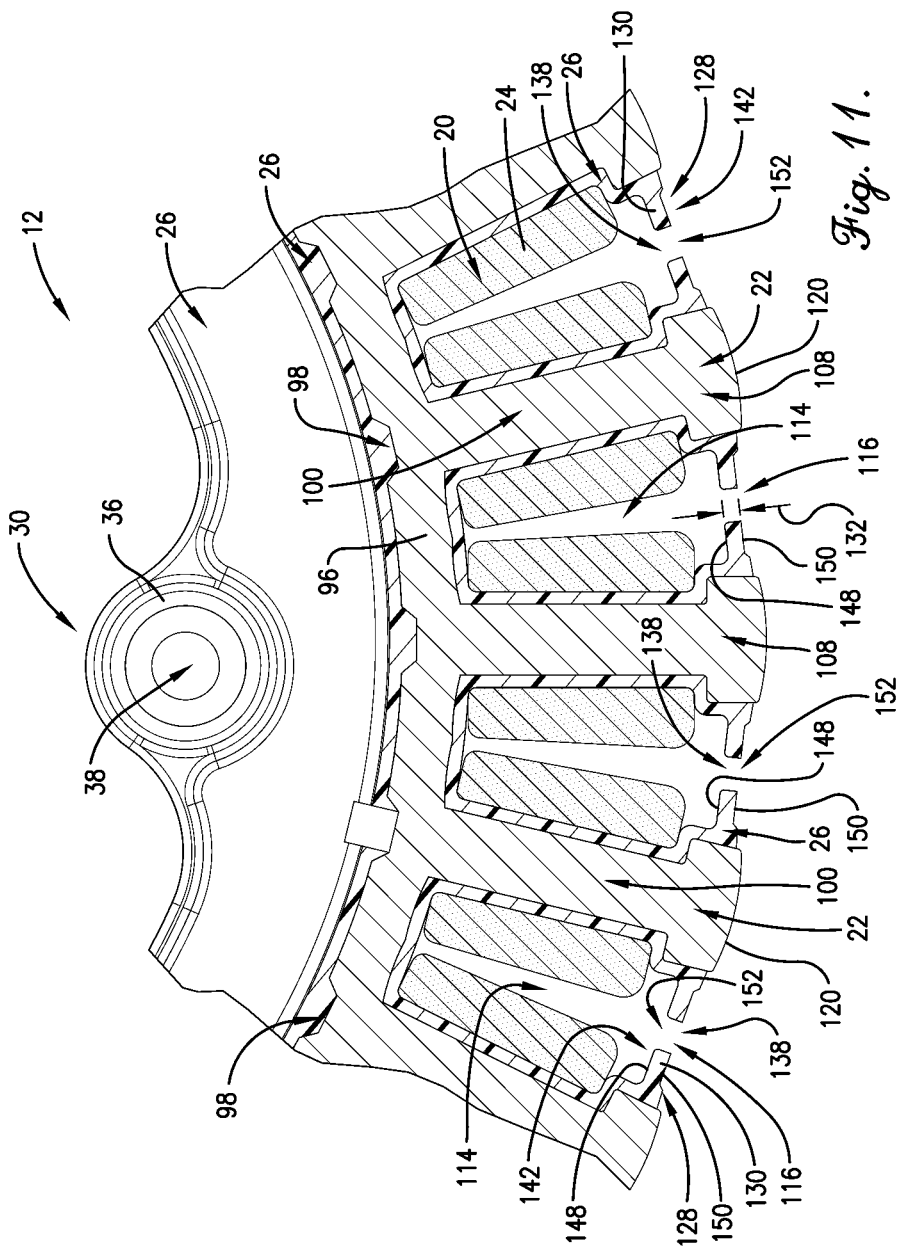
FIG. 11 is a cross-sectional view of the stator portion taken along line 11-11 of FIG. 8.

Preferably, each of the wings 128 comprises a wall 130 projecting circumferentially outwardly from one of the head ends 110,112 of the teeth 22. As best shown in FIGS. 7, 9, and 11, it is preferable that each wing 128 extends from one of the head ends 110,112 immediately adjacent the outermost face 120 of the corresponding tooth 22.

In a preferred embodiment, each of the wings 128 presents a generally radial wing height 132. Preferably, the wing height 132 is less than the previously discussed tooth head height 124. The walls 130 preferably restrict radially outward shifting of the wiring 24 of the coils 20, with the relative dimensioning (more particularly, the height 132) of the wings 128 and their positioning adjacent the outermost faces 120 maximizing the space available for the coils 20 and the wiring 24. (As will be readily understood by those of ordinary skill in the art, although the schematic nature of the coil illustrations shows symmetrical, well defined coils, wiring could feasibly extend radially outwardly at the outer layers of the coils so as to fill the currently illustrated space between the coils and the wings.)

In a preferred embodiment, each tooth 22 presents opposite, axially spaced apart endmost surfaces 134 and 136. Each of the wire retention wings 128 preferably extends at least substantially continuously between the endmost surfaces 134 and 136 of the teeth 22. However, it is permissible according to some aspects of the present invention for discontinuous extension to occur for one or more wings.

As illustrated, the wings 128 are preferably arranged in pairs, with the wings 128 of each pair extending toward one another from adjacent ones of the teeth 22. Preferably, the wings 128 of the each pair are circumferentially spaced from one another by an axially extending opening or gap 138. The gap 138 preferably enables access of equipment during fly or shed winding of the stator 14. It is permissible according to some aspects of the present invention, however, for the wings to extend such that the gap is too small for such access or such that the wings of each pair contact or circumferentially overlap each other.

Tooth-Stabilizing Wedges

In a preferred embodiment, as illustrated in FIGS. 2 and 12-18, a plurality of stator wedges 140 are provided. Each wedge 140 is received within a corresponding one of the slot openings 116 defined between the head ends 110,112 of the teeth 22 and is preferably compressibly retained in the slot opening 116 by a pair of wedge-retaining structures 142. More particularly, the wedges 140 and the wedge-retaining structures 142 are configured to be resiliently compressed to thereby maintain a force against the teeth 22, which reduces tooth movement (e.g., vibration) and consequently noise. Furthermore, radial and axial movement of the wedges 140 relative to the core 18 is at least substantially prevented.

As best shown in FIGS. 7, 8, 12, 13, and 15, the wedge-retaining structures 142 are preferably at least in part fixed relative to the core 18 and most preferably each comprises a pair of the walls 130 previously discussed in relation to the wire retention wings 128. It is permissible according to some aspects of the present invention, however, for the walls to function in a manner exclusive of wire retention.

As also discussed above in relation to wire retention, the walls 130 preferably extend generally circumferentially from respective ones of the head ends 110,112 so as to project into corresponding ones of the slot openings 116. Furthermore, the wedge-retaining structures 142, including the walls 130, are preferably defined by the aforementioned overmolding 26. It is permissible according to some aspects of the present invention, however, for the wedge-retaining structures to be alternately defined. For instance, the wedge-retaining structures might be fixed to the core in another manner (e.g., if the stator is not provided with the overmolding).

Each wall 130 preferably presents a first axial wall end 144, an axially opposite second wall end 146, and a pair of wall surfaces 148,150 extending between the walls ends 144,146 and facing generally radially opposite directions.

As discussed previously with respect to the preferred wire retention function, the walls 130 are preferably spaced apart from each other to define an axially extending opening or gap 138 therebetween. In a preferred embodiment and as best illustrated in FIGS. 2, 7, 8, 12, 13, and 15, the walls 130 preferably further define a constricted region 152 of the gap 138. As will be discussed in greater detail below, however, it is permissible according to some aspects of the present invention for the gap to be devoid of a constricted region.

Each wall 130 further preferably presents a pair of axially oppositely facing shoulders 154,156 defined along the gap 138 at opposite ends of the constricted region 152. However, according to some aspects of the present invention, the walls might suitably be devoid of shoulders or include alternately positioned shoulders.

Figure 12:
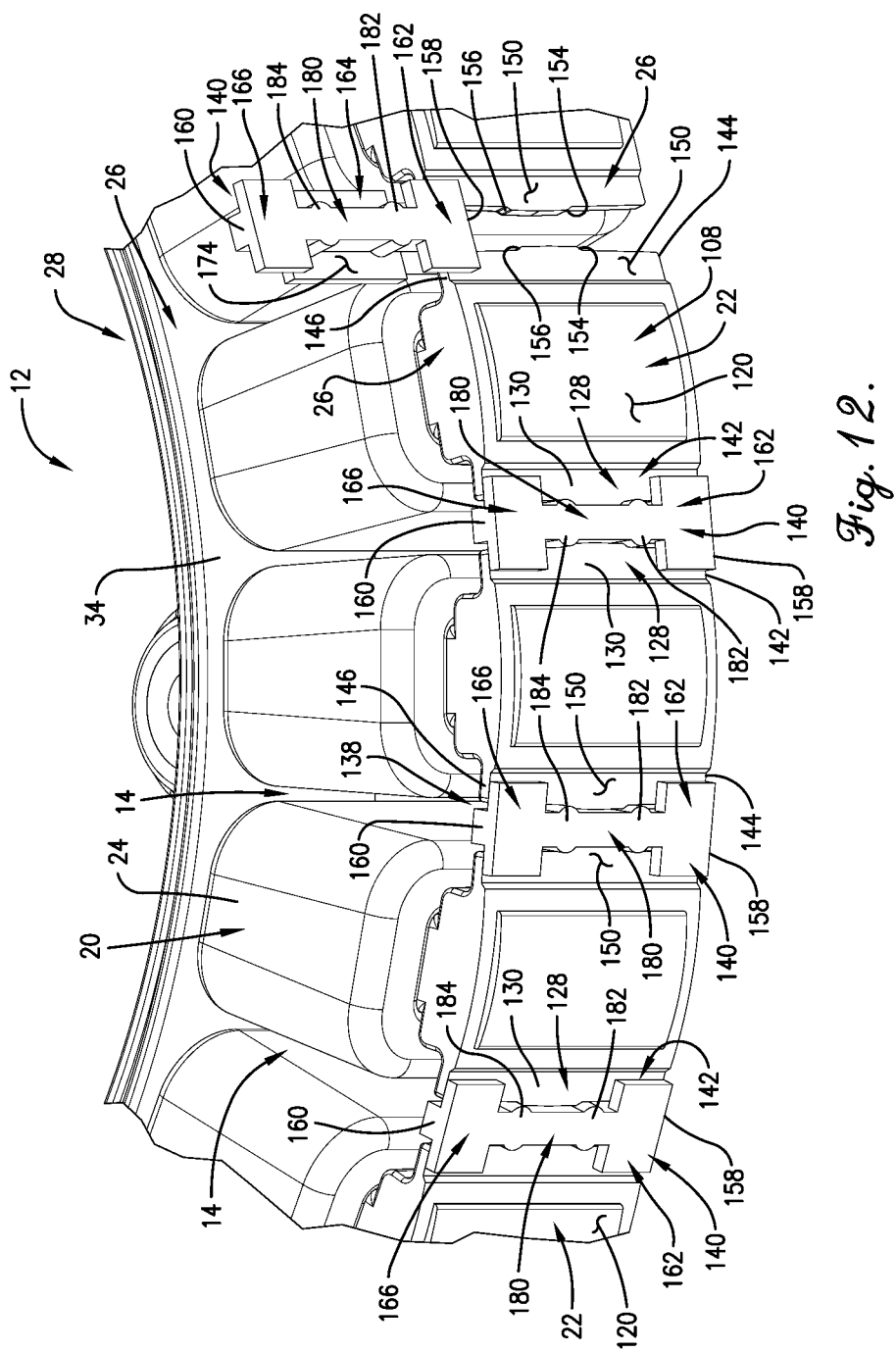
FIG. 12 is a top perspective view of a portion of the stator, particularly illustrating the wedges and the wedge-retaining structures.
Figure 13:
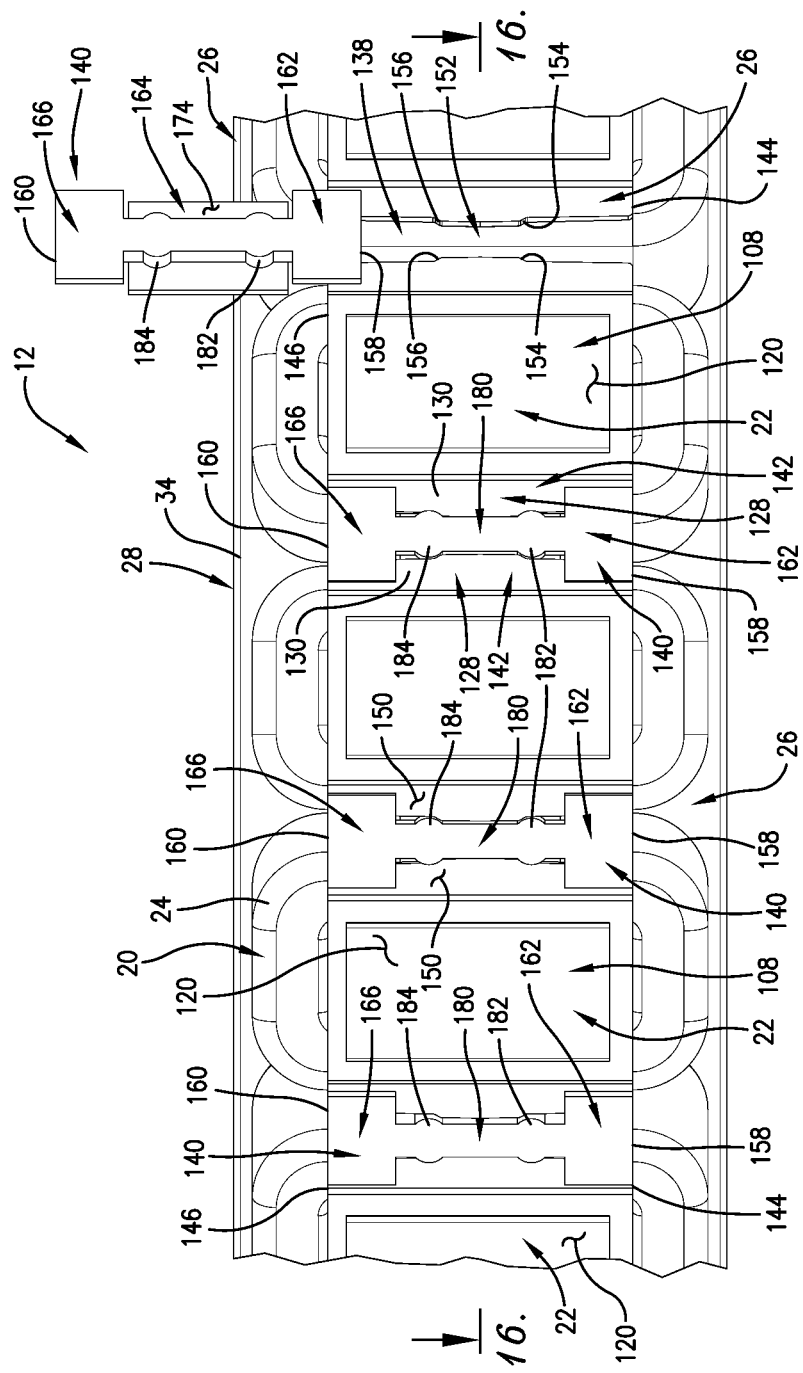
FIG. 13 is a side view of the stator portion of FIG. 12.

The wedges 140 are preferably dimensioned and configured to move axially into corresponding ones of the gaps 138, as illustrated in FIGS. 12 and 13.

As best shown in FIGS. 17 and 18, each wedge 140 preferably includes a first axial wedge end 158 and an axially opposite second wedge end 160. Furthermore, each wedge 140 preferably includes a first locking plate 162 adjacent the first axial wedge end 156, a second locking plate 164 axially and radially spaced relative to the first locking plate 162, and a third locking plate 166 adjacent the second axial wedge end 160 and in at least substantial radial alignment with the first locking plate 162. That is, three (3) axially and radially staggered locking plates 162,164,166 are preferably provided. It is permissible, however, for more or fewer locking plates to be provided without departing from the scope of the present invention.

The first locking plate 162 preferably presents a first pair of wedge surfaces 168,170 that face generally radially opposite directions. The second locking plate 164 preferably presents a second pair of wedge surfaces 172,174 that face generally radially opposite directions. The third locking plate 166 preferably presents a third pair of wedge surfaces 176,178 that face generally radially opposite directions.

The locking plates 162,164,166 are each preferably rectangular in shape, although any one or more of a variety of shapes may be used without departing from the scope of the present invention. Circular plates might be used, for instance, or a combinations of triangular plates and rectangular plates could be provided. As illustrated, size variations between the plates 162,164,166 are also permissible, although it is preferred that the first and third plates 162 and 166, respectively, are at least substantially identical in size.

As best shown in FIGS. 17 and 18, each of the plates 162,164,166 is preferably mounted on a generally axially extending bar 180, which preferably bisects the surfaces 168, 174, and 176.

Although the bar 180 preferably presents a constant, generally rectangular cross-section along at least a substantial portion of its length, the bar 180 preferably includes projections 182,184 that extend generally circumferentially on either side of the rectangular portions of the bar 180.

Figure 14:
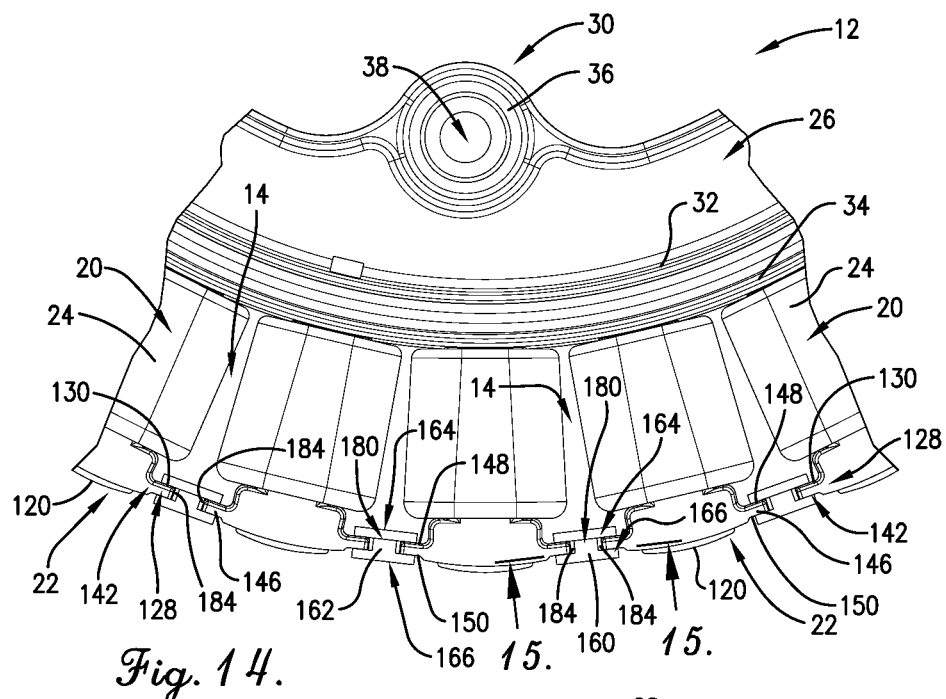
FIG. 14 is a top view of the stator portion of FIGS. 12 and 13.

As best illustrated in FIGS. 14 and 16, during and after insertion of each wedge 140 into the corresponding slot opening 116, the wedge surface 168 of the first locking plate 162 preferably engages the wall surface 150 of each of the adjacent walls 130. Similarly, the wedge surface 174 of the second locking plate 164 preferably engages the wall surface 148 of each of the adjacent walls 130, and the wedge surface 176 of the third locking plate 166 preferably engages the wall surface 150 of each of the adjacent walls 130.

Figure 15:
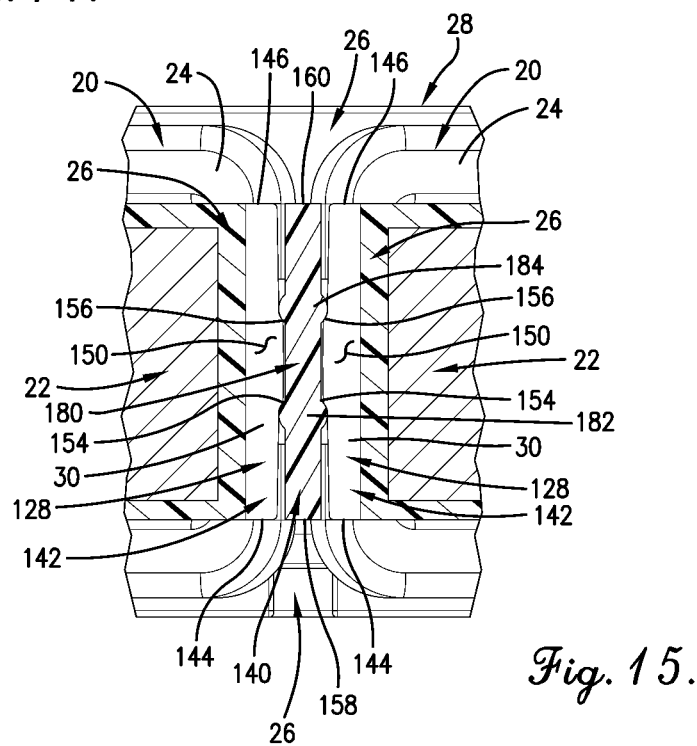
FIG. 15 is a cross-sectional view of a portion of the stator portion taken along line 15-15 of FIG. 14.

Furthermore, as best shown in FIG. 15, the projections 182,184 preferably engage corresponding ones of the shoulders 154,156 to restrict relative axial movement between the wedge-retaining structure 142 and the corresponding wedge 140. More particularly, each of the projections 182,184 preferably has a circumferential dimension greater than that of the constricted region 152 of the gap 138 such that, absent the application of a significant axial force, the projections 182,184 cannot pass axially through the constricted region 152.

Preferably, the wedges 140 are at least substantially symmetric along a transverse (i.e., generally circumferential) axis, such that insertion into the gap 138 may be led by either the first axial wedge end 158 or the second axial wedge end 160. Such symmetry provides advantageous flexibility during assembly of the stator 14.

A second preferred embodiment of the present invention is illustrated in FIGS. 19-23. It is initially noted that, with certain exceptions to be discussed in detail below, many of the elements of the second preferred embodiment are the same as or very similar to those described in detail above in relation to the first preferred embodiment. Therefore, for the sake of brevity and clarity, redundant descriptions and numbering will be generally avoided here. Unless otherwise specified, the detailed descriptions of the elements presented above with respect to the first preferred embodiment should therefore be understood to apply at least generally to the second preferred embodiment, as well.

Figure 20:
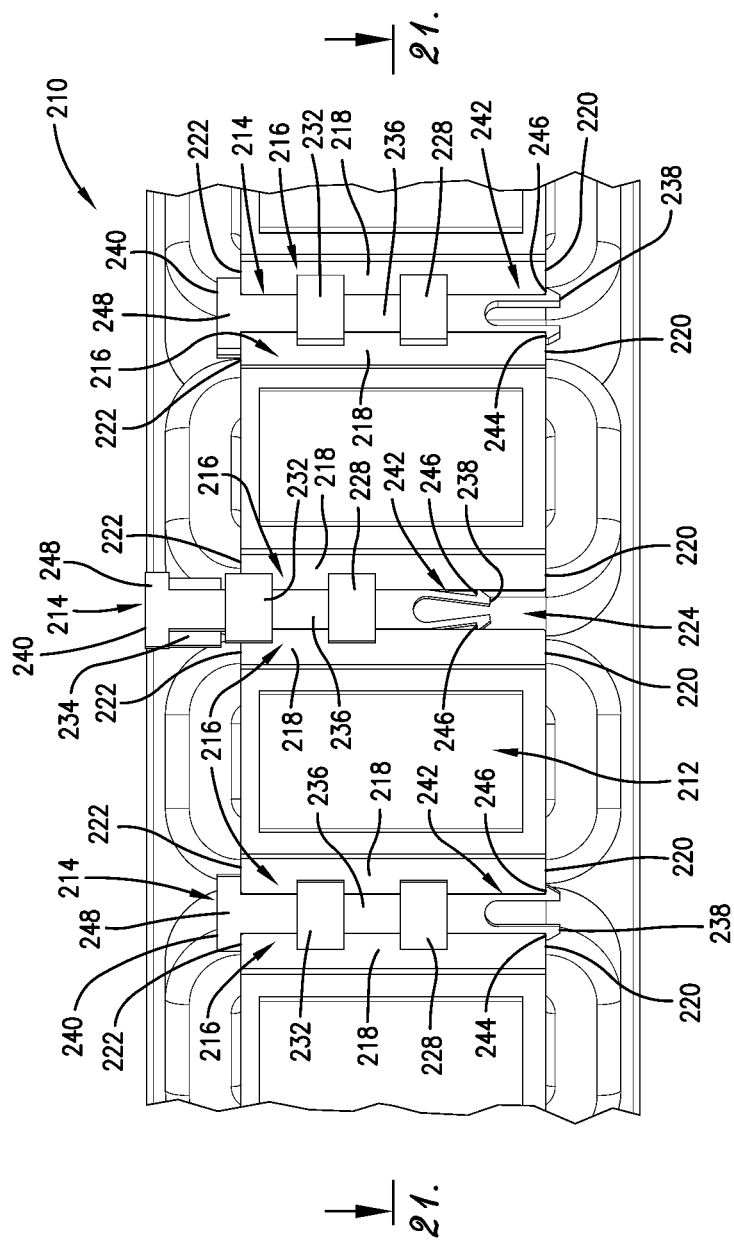
FIG. 20 is a front view of the stator portion of FIG. 19.
Figure 21:
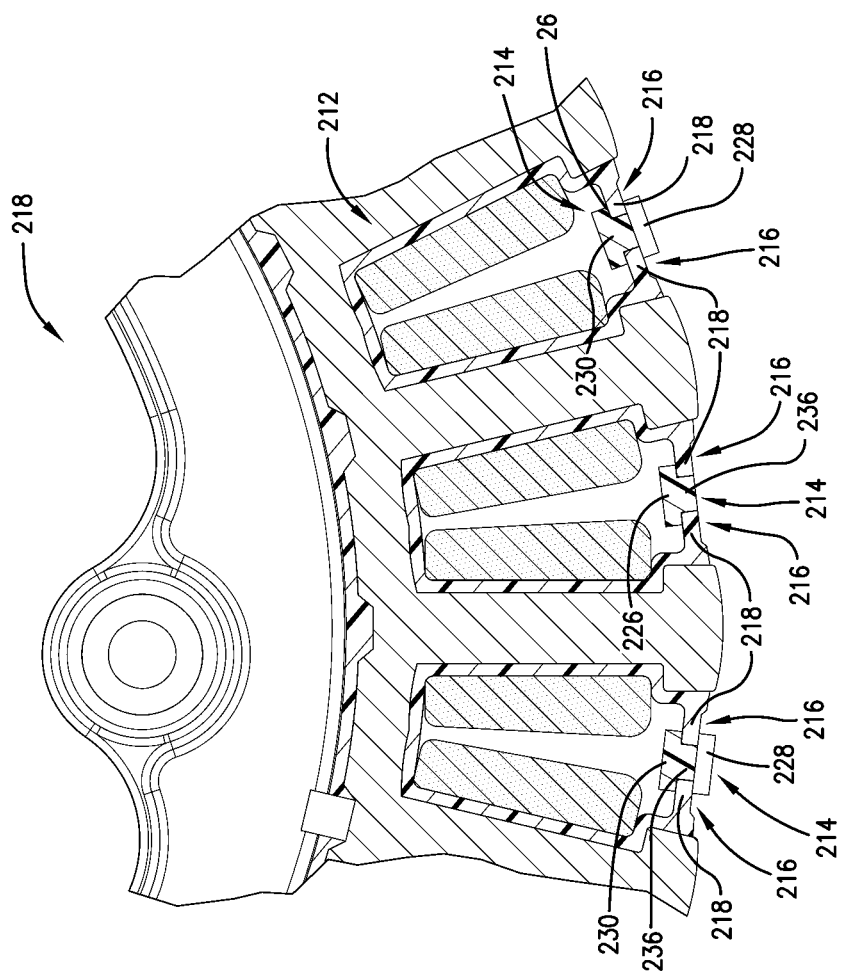
FIG. 21 is a cross-sectional view of the stator portion taken along line 21-21 of FIG. 20.

As best shown in FIGS. 19-21, in a second preferred embodiment, a stator 210 including, among other things, a core 212, a plurality of wedges 214, and a plurality of wedge-retaining structures 216 is provided. The wedge retaining structures 216 preferably include walls 218 defining first and second axial wall ends 220 and 222, respectively, and a gap 224 configured to receive corresponding ones of the wedges 214. However, in contrast to the walls 130 of the first preferred embodiment, the walls 218 of the second preferred embodiment preferably do not define a constricted region of the gap 224. Such a region could be defined, however, without departing from the scope of the present invention.

In a similar manner to the wedges 140 of the first preferred embodiment, the wedges 214 of the second preferred embodiment also preferably include a plurality of locking plates arranged along a bar. More particularly, as best shown in FIGS. 22 and 23, a first locking plate 226, a second locking plate 228, a third locking plate 230, a fourth locking plate 232, and a fifth locking plate 234 are preferably mounted in a radially and axially sequentially staggered manner along a bar 236.

As best shown in FIGS. 22 and 23, each wedge 214 preferably presents a first axial wedge end 238 and an axially opposite second wedge end 240. Each wedge 214 preferably further includes a catch 242 adjacent the first wedge end 238. The catch 242 preferably includes a pair of tabs 244,246, each of which extends in a generally circumferentially outward direction. The catch 242 is preferably configured to latchingly engage the first wall ends 220 of the corresponding walls 218 via engagement of the tabs 244,246 with respective ones of the first wall ends 220.

Preferably, each of the wedges 214 further includes an end plate 248 adjacent the second wedge end 240. The end plate 248 extends at least substantially perpendicularly to the locking plates 226,228,230,232,234 and is preferably configured to engage the second wall ends 222 of the corresponding walls 218.

Although the end plate 248 and the catch 242 are preferred components of each of the wedges 214, it is noted that other means of retaining each wedge relative to the core may be used without departing from the scope of some aspects of the present invention.

A third preferred embodiment of the present invention is illustrated in FIGS. 24 and 25. It is initially noted that, with certain exceptions to be discussed in detail below, many of the elements of the third preferred embodiment are the same as or very similar to those described in detail above in relation to the first and second preferred embodiments. Therefore, for the sake of brevity and clarity, redundant descriptions and numbering will be generally avoided here. Unless otherwise specified, the detailed descriptions of the elements presented above with respect to the first and second preferred embodiments should therefore be understood to apply at least generally to the third preferred embodiment, as well.

As shown in FIGS. 24 and 25, in a third preferred embodiment, a stator 310 including, among other things, a core 312, a plurality of wedges 314, and a plurality of wedge-retaining structures 316 is provided. The wedge retaining structures 316 each preferably include first and second walls 318a,318b, respectively. The wedge-retaining structures 316 further preferably define an axially extending gap 320 configured to receive corresponding ones of the wedges 314.

Like the walls 218 of the second preferred embodiment, the walls 318a,318b of the third preferred embodiment preferably do not define a constricted region of the gap 320. Such a region could be defined, however, without departing from the scope of the present invention.

The stator 310 preferably further comprises a plurality of hinges 322. Each hinge 322 preferably intercouples one of the wedge-retaining structures 316 and a corresponding one of the wedges 314. Each of the wedges 314 is thus swingable back and forth between an open position, in which the gap 320 is at least substantially unobstructed in a generally radial direction, and an operational position in which the respective wedge 314 spans the gap 320. Furthermore, when in the operational position, each wedge 314 is compressibly retained between adjacent ones of the wedge-retaining structures 316. The open and operational positions, as well as an intermediate position, are illustrated in both of FIGS. 24 and 25.

In a preferred embodiment, each hinge 322 intercouples one of the wedges 314 with just the corresponding first wall 318a. As will be discussed in greater detail below, however, alternative hinging configurations are permissible without departing from the scope of some aspects of the present invention. Hinges might be associated with both walls of each wedge-retaining structure, for instance, with the wedges themselves comprising a plurality of segments each corresponding to one of the hinges. The coupling might also alternatively be between each wedge and the second wall or be with the first wall for some wedges and the second wall for other wedges.

Preferably, each wedge 314 and the corresponding second wall 318b cooperatively define complemental locking structure 324 for retaining the respective wedge 314 in the operational position. More particularly, as shown in FIGS. 24 and 25, each wedge 314 preferably includes an axially extending catch 326 configured to latchingly engage the wall 318b via a generally circumferentially extending tab 328. Preferably, the catch 326 extends at least substantially along the entire axial length of the wedge 314 and engages the wall 318b along at least substantially its entire axial length. It is permissible, however, for any one or more of a variety of locking mechanisms to be used without departing from the scope of the present invention. A catch might be provided on the wall rather than on the wedge, for instance, or multiple catches might be provided. A single catch extending only along a portion of the axial lengths of the corresponding wedge and wall might be provided, a hook and loop structure might be used, or adhesives might act as or complement the locking structure.

Preferably, the stator 310 includes electrically insulative overmolding 330 molded over at least a portion of the core 312. The overmolding 330 preferably defines both the wedge-retaining structures 316 and, in contrast to the first and second preferred embodiments, the wedges 314 themselves. The overmolding 330 also preferably defines the hinges 322 through presentation of radially thinned regions. However, it is permissible according to some aspects of the present invention for the wedges, hinges, and/or wedge-retaining structures to be discretely formed.

Figure 27:
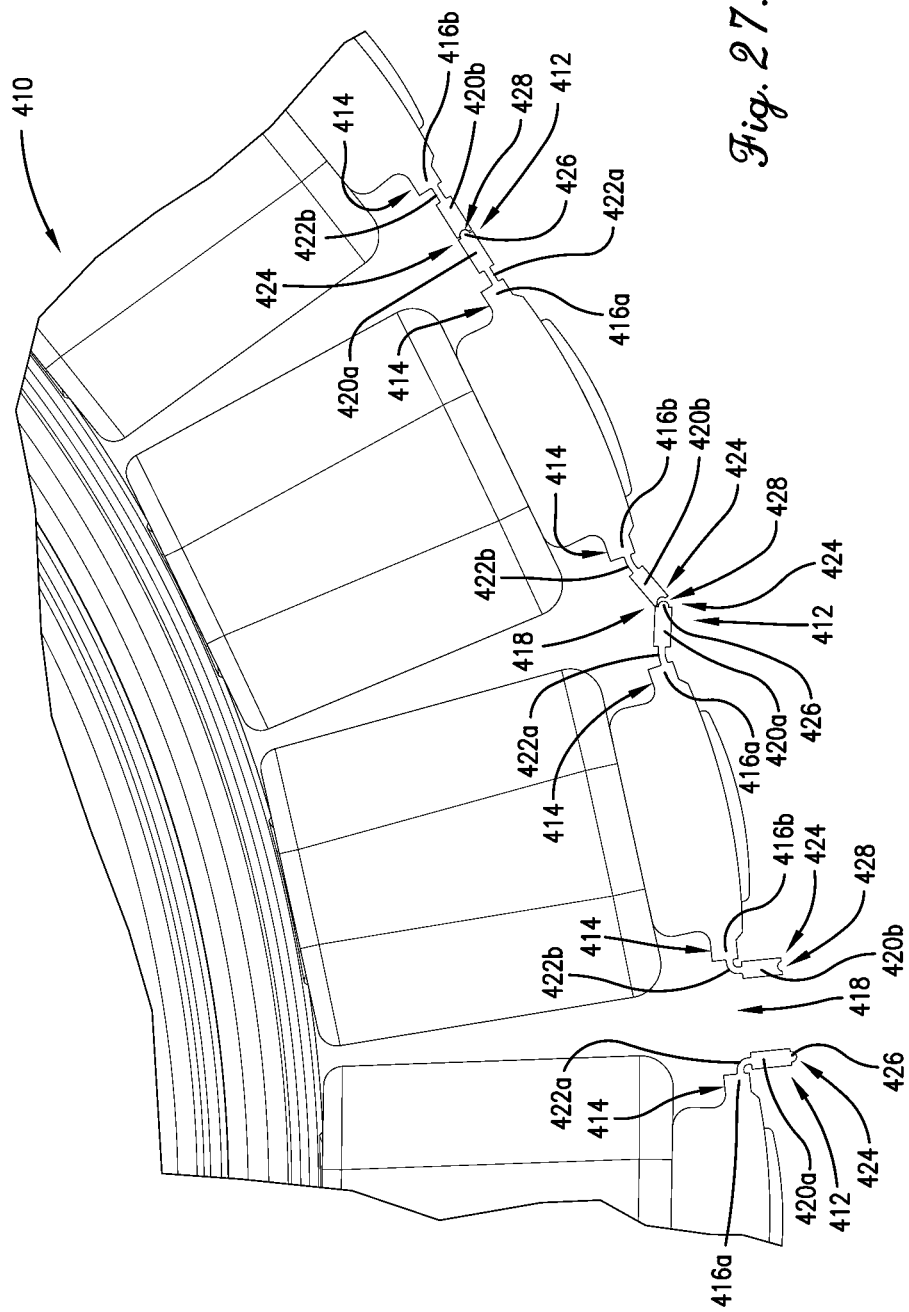
FIG. 27 is a top view of the stator portion of FIG. 26.

A fourth preferred embodiment of the present invention is illustrated in FIGS. 26 and 27. It is initially noted that, with certain exceptions to be discussed in detail below, many of the elements of the fourth preferred embodiment of the present invention are the same as or very similar to those described in detail above in relation to the first, second, and third preferred embodiments. Therefore, for the sake of brevity and clarity, redundant descriptions and numbering will be generally avoided here. Unless otherwise specified, the detailed descriptions of the elements presented above with respect to the first, second, and third preferred embodiments should therefore be understood to apply at least generally to the fourth preferred embodiment, as well.

As shown in FIGS. 26 and 27, in a fourth preferred embodiment, a stator 410 including a plurality of wedges 412 and a plurality of wedge-retaining structures 414 is provided. The wedge retaining structures 414 each preferably include first and second walls 418a,418b, respectively.

The wedge-retaining structures 414 further preferably define an axially extending gap 418 configured to receive corresponding ones of the wedges 412.

Like the walls 218 of the second preferred embodiment and the walls 318a,318b of the third preferred embodiment, the walls 416a,416b of the fourth preferred embodiment preferably do not define a constricted region of the gap 418. Such a region could be defined, however, without departing from the scope of the present invention.

Each wedge 412 preferably includes a pair of panels 420a,420b hingedly coupled to respective ones of the walls 416a,416b via hinges 422a,422b and cooperatively spanning the gap 418 when the respective wedge 412 is in an operational position. The panels 420a,420b are compressibly retained between adjacent ones of the wedge-retaining structures 414 when in the operational position.

As shown in FIGS. 26 and 27, the panels 420a,420b are also moveable to an open position, in which the gap 418 is at least substantially unobstructed in a generally radial direction, and through intermediate positions between the open and operational positions Preferably, when in the operational position, each of the panels 420a,420b spans at least substantially the entirety of the respective gap 418 in a generally axial direction and about half of the gap 418 in a generally circumferential. However, it is permissible according to some aspects of the present invention for non-equal spans to be provided by the panels. It is also permissible for the panels to each span at least substantially the entirety of the gap, with the panels thus overlapping each other. Still further, the panels might be alternately oriented so as to each span half of the gap in a generally axial direction and at least substantially the entirety of the gap in a generally circumferential direction. Furthermore, more than two panels might be provided, with equal or non-equal spanning being provided by the more than two panels in any of a variety of manners, including but not limited to those described above. It is also within the scope of some aspect of the present invention for multi-panel embodiments to be provided in which the panels are hingedly interconnected with only one wall of each wedge-retaining structure.

Preferably, the panels 420a,420b of each wedge 412 cooperatively define complemental locking structure 424 for retaining the panels 420a,420b (and thus the wedge 412) in the operational position. More particularly, as shown in FIGS. 26 and 27, each panel 420a preferably includes a rounded projection 426 extending continuously axially along at least substantially the entire length thereof. Each panel 420b preferably includes a complementary rounded groove 428 extending continuously axially along at least substantially the entire length thereof. The projections 426 are latchingly received in the grooves 428 when the panels 420a,420b are pivotably shifted into the operational position.

Although the above-described locking structure 424 is preferred, it is within the scope of the present invention for any one or more of a variety of locking structures to be used. These include but are not limited to variations in continuity, number, and form based on those discussed above with respect to the third preferred embodiment.

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently as part of separate embodiments in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby states their intent to rely on the Doctrine of Equivalents to determine and assess the reasonably fair scope of the present invention as pertains to any apparatus not materially departing from but outside the literal scope of the invention set forth in the following claims.

What is claimed is:

1. A stator for use in an electric motor, said stator comprising:
   a circumferentially continuous annular core including a plurality of arcuately spaced apart teeth,
   each of said teeth including a generally radial leg and a head projecting from the leg to present a pair of arcuately spaced apart head ends, with a slot opening being defined between the opposed head ends of each adjacent pair of teeth;
   a plurality of stator wedges,
   each of said wedges including first and second locking plates that cooperatively present wedge surfaces facing generally radially opposite directions; and
   an electrically insulative overmolding molded over at least a portion of the core,
   said overmolding defining a plurality of wedge-retaining structures, each being at least in part fixed relative to the core and cooperating with a respective one of the wedges to compressibly retain the respective wedge between the head ends defining the corresponding slot opening,
   each of said wedge-retaining structures including a pair of walls,
   each of said walls projecting into the corresponding slot opening from a respective one of the head ends,
   said walls being spaced apart from one another to define an axially extending gap therebetween,
   each of said wedges being axially received within a corresponding one of the gaps, with the wedge cooperating with the corresponding wedge-retaining structure to prevent radial and axial movement of the wedge relative to the core,
   said walls presenting radially opposite inner and outer faces, each of which engages a respective one of the wedge surfaces of the corresponding wedge to restrict relative radial movement between the wedge-retaining structure and the corresponding wedge.

2. The stator as claimed in claim 1,
   said overmolding defining the wedges.

3. The stator as claimed in claim 1,
   said walls presenting axially oppositely facing shoulders along the gap,
   each of said wedges including projections configured to engage respective ones of the shoulders to restrict relative axial movement between the wedge-retaining structure and the respective wedge.

4. The stator as claimed in claim 3,
   said walls defining a constricted region of the gap opening,
   said shoulders being defined at opposite ends of the constricted region, said projections having a circumferential dimension greater than that of the constricted region of the gap.

5. The stator as claimed in claim 1,
each of said walls presenting a first wall end and an axially opposite second wall end,
each of said wedges including a catch adjacent a first axial wedge end thereof,
said catch being configured to latchingly engage at least one of the first wall ends.

6. The stator as claimed in claim 5,
said catch including a pair of tabs each engaging a respective one of the first wall ends.

7. The stator as claimed in claim 5,
each of said wedges including an end plate adjacent a second wedge end thereof,
said end plate being configured to engage at least one of the second wall ends.

8. The stator as claimed in claim 5,
said end plate being at least substantially perpendicular to the locking plates.

9. The stator as claimed in claim 1,
said core being formed from a helically wound stator lamination.

10. The stator as claimed in claim 1,
said inner and outer faces being defined on each of the walls, such that each of the wedge surfaces engages both of the walls.

* * * * *